(12) United States Patent
Mizusaki

(10) Patent No.: US 9,182,632 B2
(45) Date of Patent: *Nov. 10, 2015

(54) LIQUID CRYSTAL DISPLAY DEVICE AND METHOD FOR MANUFACTURING LIQUID CRYSTAL DISPLAY DEVICE

(75) Inventor: Masanobu Mizusaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 143 days.

This patent is subject to a terminal disclaimer.

(21) Appl. No.: 13/991,489

(22) PCT Filed: Dec. 6, 2011

(86) PCT No.: PCT/JP2011/078159
§ 371 (c)(1),
(2), (4) Date: Jun. 4, 2013

(87) PCT Pub. No.: WO2012/077668
PCT Pub. Date: Jun. 14, 2012

(65) Prior Publication Data
US 2013/0271712 A1    Oct. 17, 2013

(30) Foreign Application Priority Data
Dec. 6, 2010 (JP) .................. 2010-271627

(51) Int. Cl.
*G02F 1/1337* (2006.01)
(52) U.S. Cl.
CPC ........ *G02F 1/1337* (2013.01); *G02F 1/133711* (2013.01); *G02F 1/133723* (2013.01); *B32B 2457/202* (2013.01); *Y10T 428/1018* (2015.01); *Y10T 428/1023* (2015.01)
(58) Field of Classification Search
CPC ............. C08F 222/1006; C08F 220/18; G02F 1/1333; G02F 1/1337; G02F 1/133753; G02F 1/133788; G02F 1/133711; G02F 1/133723; G02F 2001/133757; G02F 2001/133761; G02F 2001/133397; G02F 2001/133742
USPC .......................... 428/1.2–1.28; 349/123–136
See application file for complete search history.

(56) References Cited

U.S. PATENT DOCUMENTS 6,201,588 B1    3/2001 Walton et al.
6,939,587 B1    9/2005 Kumar et al.
(Continued)

FOREIGN PATENT DOCUMENTS

CN    1664657    9/2005
CN    101108968    1/2008
(Continued)

OTHER PUBLICATIONS

U.S. Office Action mailed Dec. 22, 2014 in U.S. Appl. No. 13/821,412.
(Continued)

*Primary Examiner* — Sophie Hon
(74) *Attorney, Agent, or Firm* — Nixon & Vanderhye P.C.

(57) ABSTRACT

The present invention provides a liquid crystal display device that rarely causes burn-in at high throughput. The present invention provides a liquid crystal display device that includes a pair of substrates and a liquid crystal layer between the pair of substrates, wherein at least one of the pair of substrates includes an alignment layer and a polymer layer for controlling the alignment of adjacent liquid crystal molecules, the polymer layer being disposed on the alignment layer, the polymer layer has a structure containing at least three condensed benzene rings, and the alignment layer is covalently bonded to the polymer layer.

13 Claims, 3 Drawing Sheets

(56) References Cited

U.S. PATENT DOCUMENTS

| | | | |
|---|---|---|---|
| 7,169,449 B2 | 1/2007 | Nakanishi et al. | |
| 8,551,358 B2 * | 10/2013 | Lee et al. | 252/299.6 |
| 8,691,350 B2 | 4/2014 | Mizusaki et al. | |
| 2003/0067579 A1 | 4/2003 | Inoue et al. | |
| 2003/0086044 A1 | 5/2003 | Inoue et al. | |
| 2003/0095229 A1 | 5/2003 | Inoue et al. | |
| 2004/0169790 A1 | 9/2004 | Inoue et al. | |
| 2004/0174471 A1 | 9/2004 | Nakanishi et al. | |
| 2004/0246406 A1 | 12/2004 | Inoue et al. | |
| 2004/0262402 A1 | 12/2004 | Wilderbeek et al. | |
| 2004/0263719 A1 | 12/2004 | Inoue et al. | |
| 2005/0018105 A1 | 1/2005 | Inoue et al. | |
| 2005/0024556 A1 | 2/2005 | Nakahata et al. | |
| 2005/0030445 A1 | 2/2005 | Inoue et al. | |
| 2005/0116200 A1 | 6/2005 | Nakanishi et al. | |
| 2005/0253988 A1 | 11/2005 | Inoue et al. | |
| 2005/0264737 A1 | 12/2005 | Kataoka et al. | |
| 2006/0279502 A1 | 12/2006 | Chang | |
| 2007/0182887 A1 | 8/2007 | Haga et al. | |
| 2008/0090026 A1 | 4/2008 | Bernatz et al. | |
| 2008/0179565 A1 | 7/2008 | Hsieh et al. | |
| 2008/0293888 A1 | 11/2008 | Bachels et al. | |
| 2008/0316406 A1 | 12/2008 | Inoue et al. | |
| 2009/0002858 A1 | 1/2009 | Okutsu et al. | |
| 2009/0141215 A1 | 6/2009 | Bremer et al. | |
| 2009/0146936 A1 | 6/2009 | Ueda et al. | |
| 2010/0076952 A1 | 3/2010 | Wang et al. | |
| 2010/0253605 A1 | 10/2010 | Inada | |
| 2011/0051049 A1 | 3/2011 | Goetz et al. | |
| 2011/0058134 A1 | 3/2011 | Inoue et al. | |
| 2011/0164213 A1 | 7/2011 | Nakanishi et al. | |
| 2011/0199566 A1 | 8/2011 | Mazusaki et al. | |
| 2011/0267574 A1 * | 11/2011 | Kawahira et al. | 349/158 |
| 2012/0033167 A1 | 2/2012 | Mizusaki et al. | |
| 2013/0004679 A1 | 1/2013 | Bachels | |
| 2013/0128202 A1 | 5/2013 | Mizusaki et al. | |
| 2013/0128203 A1 | 5/2013 | Mizusaki et al. | |
| 2013/0128204 A1 | 5/2013 | Mizusaki et al. | |
| 2013/0135570 A1 | 5/2013 | Mizusaki et al. | |
| 2013/0169906 A1 | 7/2013 | Nakanishi et al. | |
| 2013/0169916 A1 | 7/2013 | Mizusaki | |
| 2013/0271712 A1 | 10/2013 | Mizusaki et al. | |
| 2013/0286340 A1 | 10/2013 | Mizusaki et al. | |

FOREIGN PATENT DOCUMENTS

| | | | |
|---|---|---|---|
| CN | 101008784 B | 1/2011 | |
| GB | 2398077 A * | 8/2004 | C09K 19/38 |
| JP | 63-233952 | 9/1988 | |
| JP | 6-18898 | 1/1994 | |
| JP | 9-227454 | 9/1997 | |
| JP | 9-255706 | 9/1997 | |
| JP | 10-338880 | 12/1998 | |
| JP | 2002-323701 | 11/2002 | |
| JP | 2003-177418 | 6/2003 | |
| JP | 2003-307720 A | 10/2003 | |
| JP | 2005-31288 | 2/2005 | |
| JP | 2005-509187 | 4/2005 | |
| JP | 2005-221617 | 8/2005 | |
| JP | 2005-338613 | 12/2005 | |
| JP | 2006-058775 | 3/2006 | |
| JP | 2006-317896 | 11/2006 | |
| JP | 2006-343719 | 12/2006 | |
| JP | 2008-76950 | 4/2008 | |
| JP | 2008-116931 | 5/2008 | |
| JP | 2008-134666 | 6/2008 | |
| JP | 4175826 | 8/2008 | |
| JP | 2009-520702 | 5/2009 | |
| JP | 2009-132718 A | 6/2009 | |
| JP | 2009-139629 | 6/2009 | |
| JP | 2010-107537 | 5/2010 | |
| JP | 2010107537 A * | 5/2010 | |
| WO | 2008/078629 | 7/2008 | |
| WO | WO 2009/118086 | 10/2009 | |
| WO | WO 2010/026721 | 3/2010 | |
| WO | 2010/041665 | 4/2010 | |
| WO | WO 2010/047011 | 4/2010 | |
| WO | WO 2010/079703 | 7/2010 | |
| WO | WO 2010079703 A1 * | 7/2010 | G02F 1/1337 |
| WO | WO 2010/116564 | 10/2010 | |

OTHER PUBLICATIONS

U.S. Office Action mailed Dec. 15, 2014 in U.S. Appl. No. 13/813,828.
U.S. Office Action mailed Dec. 10, 2014 in U.S. Appl. No. 13/813,772.
U.S. Office Action mailed Dec. 4, 2014 in U.S. Appl. No. 13/814,055.
International Search Report for PCT/JP2011/078159 mailed Jan. 24, 2012.
Office Action mailed Oct. 24, 2014 in U.S. Appl. No. 13/814,025.
International Search Report mailed Oct. 4, 2011 in PCT/JP2011/070009.
International Search Report for PCT/JP2011/067049 mailed Sep. 6, 2011.
International Search Report for PCT/JP2011/067047, dated Sep. 6, 2011.
S. Mery et al., Liquid Crystals Containing a 2,6-Distributed Anthracene Core-Mesomorphism, Charge Transport and Photochemical Properties, Journal of Materials Chemistry, 2003, 1622-1630.
Restriction Requirement mailed Sep. 5, 2014 in U.S. Appl. No. 13/813,828.
International Search Report for PCT/JP2011/067051 mailed Sep. 6, 2011.
Restriction Requirement mailed Oct. 8, 2014 in U.S. Appl. No. 13/814,055.
Restriction Requirement mailed Sep. 18, 2014 in U.S. Appl. No. 13/813,772.
International Search Report for PCT/JP2011/079706 mailed Apr. 3, 2012.
International Search Report for PCT/JP2011/067052, mailed Sep. 6, 2011.
International Search Report for PCT/JP2011/066159 mailed Sep. 6, 2011.
K. Maruyama et al., "The Photochemical Reaction of a-Diketones", Bulletin of the Chemical Society of Japan, Mar. 1972, vol. 45 pp. 847-851.
U.S. Office Action mailed Feb. 13, 2015 in U.S. Appl. No. 13/814,025.
U.S. Office Action mailed Mar. 13, 2015 in U.S. Appl. No. 13/721,322.
U.S. Office Action mailed Nov. 6, 2014 in U.S. Appl. No. 13/721,322.
U.S. Office Action mailed Mar. 30, 2015 in U.S. Appl. No. 13/813,772 (Mizusaki).
Office Action mailed Mar. 13, 2015 in U.S. Appl. No. 13/821,322 (Nakanishi).
Office Action mailed Nov. 6, 2014 in U.S. Appl. No. 13/821,322 (Nakanishi).
U.S. Office Action mailed Mar. 17, 2015 in U.S. Appl. No. 13/814,055 (Mizusaki).
U.S. Office Action mailed Mar. 25, 2015 in U.S. Appl. No. 13/814,055 (Mizusaki).
International Search Report for PCT/JP2010/003061, mailed Jun. 8, 2010.

* cited by examiner

LIQUID CRYSTAL DISPLAY DEVICE AND METHOD FOR MANUFACTURING LIQUID CRYSTAL DISPLAY DEVICE

This application is the U.S. national phase of International Application No. PCT/JP2011/078159 filed 6 Dec. 2011 which designated the U.S. and claims priority to JP 2010-271627 filed 6 Dec. 2010, the entire contents of each of which are hereby incorporated by reference.

TECHNICAL FIELD

The present invention relates to a liquid crystal display device and a method for manufacturing a liquid crystal display device. The present invention more particularly relates to a liquid crystal display device that includes a polymer layer on an alignment layer so as to increase the alignment regulating force applied to liquid crystals and a method for manufacturing a liquid crystal display device that is suitable to form a polymer layer on an alignment layer.

BACKGROUND ART

Because of their low-profile designs, light weights, and low power consumption, liquid crystal display devices are widely used in display instruments, such as television sets, personal computers, and PDAs. In particular, as exemplified by liquid crystal display devices for television sets, the sizes of liquid crystal display devices are rapidly increasing. In order to increase their sizes, a multi-domain vertical alignment (MVA) mode is suitably used because this mode can give a high yield even for a large display area and realize a wide viewing angle. In the multi-domain vertical alignment mode, when no voltage is applied to a liquid crystal layer, liquid crystal molecules are vertically aligned on a substrate face. Thus, the multi-domain vertical alignment mode can produce a higher contrast ratio than the known twisted nematic (TN) mode.

However, the MVA mode employs ribs (projections), which reduce the aperture ratio and consequently reduce white luminance. Although the intervals of the ribs may be increased to overcome this disadvantage, a decrease in the number of ribs, which are alignment regulating structures, increases the time required to stabilize alignment upon the application of a voltage to the liquid crystals. This causes a problem of a low response speed. In order to dissolve such a problem and realize high luminance and high-speed response, a technique for providing a pretilt angle using a polymer (hereinafter also referred to as a polymer sustained alignment (PSA: alignment sustaining) technique) has been proposed (for example, Patent Literature 1). In accordance with the PSA technique, a liquid crystal composition that contains liquid crystals and a polymerizable component, such as a monomer or an oligomer (hereinafter referred to as a "monomer etc."), is charged between substrates. While a voltage 1 is applied between the substrates to incline liquid crystal molecules, the monomer etc. is polymerized to form a polymer layer. Even after the voltage application is stopped, the liquid crystals can have a predetermined pretilt angle, thereby regulating the liquid crystal alignment direction. The monomer etc. is polymerized by heat or light (ultraviolet light) irradiation. Use of the PSA technique obviates the necessity for ribs, increases the aperture ratio, and increases the speed of response because of a pretilt angle of less than 90 degrees throughout the display area.

CITATION LIST

Patent Literature

PTL 1: Japanese Unexamined Patent Application Publication No. 2003-177418

SUMMARY OF INVENTION

Technical Problem

However, known PSA techniques may have electrical burn-in and burn-in resulting from a change in pretilt angle and have room for improvement.

The present inventor investigated the reason for burn-in resulting from a change in pretilt angle and paid attention to a component of a liquid crystal layer after a polymerization reaction. The present inventor found that raw materials, such as a polymer, a monomer, and an oligomer, for a polymer layer remain in the liquid crystal layer even after the completion of a series of polymerization reactions and that the polymer, monomer, and oligomer undergo a polymerization reaction when backlighted to form an undesired polymer layer, change the pretilt angle, and cause burn-in. The present inventor also found that a reverse process, that is, elution of the polymer, monomer, and oligomer from the polymer layer occurs during the formation of the undesired polymer layer. The elution causes the degradation of the desired polymer layer, changes the pretilt angle, and also causes burn-in. The present inventor also found that a polymerization reaction of a polymerizable monomer through irradiation with light in a relatively short wavelength range (for example, ultraviolet light of less than 330 nm) for a long period of time changes the characteristics of an alignment layer and liquid crystal molecules and prevents the formation of desired alignment, thereby causing burn-in resulting from a change in pretilt angle.

The present inventor investigated the reason for electrical burn-in and found that use of a polymerization initiator causes an interaction between a polymerization initiator radical remaining in the liquid crystal layer and a liquid crystal material, thereby causing electrical burn-in.

Thus, a polymerization initiator cannot be used in known PSA techniques. This increases irradiation time and decreases throughput. On the other hand, a decrease in light irradiation time results in an increase in the amount of component(s), such as a polymer, remaining in the liquid crystal layer and causes burn-in resulting from a change in pretilt angle.

In view of the situations described above, it is an object of the present invention to provide a liquid crystal display device that rarely causes burn-in at high throughput.

Solution to Problem

The present inventor studied various methods for preventing burn-in at high throughput and focused on a material of a polymer layer. The present inventor found that a polymerizable monomer that can absorb light in a relatively high wavelength range (for example, light having a wavelength of 330 nm or more) to produce a radical and can be polymerized to form a polymer layer can be polymerized in a short period of time without using light in a relatively short wavelength range or a polymerization initiator. The present inventor also found that covalent bonding between an alignment layer and a polymerizable monomer can prevent a polymer, a monomer, and an oligomer from eluting from a polymer layer. Thus, the present inventor considered that these can successfully solve the problems described above and arrived at the present invention.

One aspect of the present invention is a liquid crystal display device (hereinafter also referred to as a first liquid crystal display device according to the present invention) that includes a pair of substrates and a liquid crystal layer between the pair of substrates, wherein at least one of the pair of substrates includes an alignment layer and a polymer layer for controlling the alignment of adjacent liquid crystal molecules, the polymer layer being disposed on the alignment layer, the polymer layer is formed by irradiating at least one monomer with light having a wavelength of 330 nm or more to produce a radical and polymerizing the at least one monomer, and the alignment layer is covalently bonded to the polymer layer.

FIG. 5 is a graph showing the relationship between the absorbance (a.u.) of a reference monomer and transmittance (%) through an alignment layer formed substrate. FIG. 6 is a graph showing the relationship between the absorbance (a.u.) of a monomer according to an embodiment of the present invention and transmittance (%) through an alignment layer formed substrate. FIG. 5 shows that many common monomers (reference monomers) can produce a radical through irradiation with light having a wavelength of 320 nm or less. However, substrates including an alignment layer on its surface generally used in liquid crystal display devices tend to be opaque to light having a wavelength of less than 330 nm because of the effects of side chains in the alignment layer. Thus, photopolymerization of a reference monomer requires irradiation with ultraviolet light having a wavelength of 310 nm for a long period of time or more than once. However, irradiation with such ultraviolet light for a long period of time may result in the degradation of a constituent of a liquid crystal display device (for example, an alignment layer or a liquid crystal layer) and cause a defect, such as burn-in. A decrease in ultraviolet irradiation time so as to prevent the degradation of an alignment layer and a liquid crystal layer, however, may result in insufficient polymerization of the monomer and incomplete formation of a polymer layer, thereby causing a defect, such as burn-in. Furthermore, general ultraviolet light sources often have a low luminescence intensity at 310 nm and a high luminescence intensity at 330 nm or more. On the other hand, FIG. 6 shows that the present invention employs a monomer that can absorb light having a wavelength of 330 nm or more and can improve light-use efficiency. Thus, a stable polymer layer can be formed by performing irradiation once for a short period of time. This can prevent electrical burn-in and burn-in resulting from a change in pretilt angle.

In accordance with the present invention, since the alignment layer is strongly bonded to the polymer layer through a covalent bond, undesired elution and reconstruction of the polymer layer can be prevented. Thus, the pretilt angle of liquid crystal molecules is substantially unchanged during use of the liquid crystal display device. This can prevent burn-in resulting from a change in pretilt angle.

The pair of substrates of the first liquid crystal display device according to the present invention may be an array substrate and a color filter substrate. The array substrate includes a plurality of pixel electrodes, which allow the alignment of liquid crystals to be controlled in individual pixels. The color filter substrate includes a plurality of color filters each facing the corresponding pixel electrode of the array substrate, thereby allowing display colors to be controlled in individual pixels.

The alignment layer regulates the inclination direction of liquid crystal molecules of the liquid crystal layer. The inclination direction of liquid crystal molecules refers to a direction along the pretilt angle in the absence of applied voltage or the inclination direction in the presence of applied voltage.

The at least one monomer is more preferably a monomer that can produce a radical through irradiation with light having a wavelength of 340 nm or more, still more preferably 430 nm or less.

The first liquid crystal display device according to the present invention essentially includes these components and is not particularly limited by another component.

Preferred aspects of the first liquid crystal display device according to the present invention will be described in detail below.

The at least one monomer is preferably a compound having the following general formula (1):

$$P^1\text{-}A^1\text{-}(Z^1\text{-}A^2)_n\text{-}P^2 \qquad (1)$$

(wherein $P^1$ and $P^2$ denote the same or different acrylate groups or methacrylate groups, $A^1$ and $A^2$ denote at least one condensed aromatic compound selected from the group consisting of the following chemical formulae (1-1) to (1-15), a hydrogen atom of $A^1$ and $A^2$ may be substituted by a halogen group, a methyl group, an ethyl group, or a propyl group, $Z^1$ denotes COO, OCO, O, CO, NHCO, CONH, or S, or represents direct bonding between $A^1$ and $A^2$ or between $A^2$ and $A^2$, and n denotes 0, 1, or 2).

[Chem. 1]

(1-1)

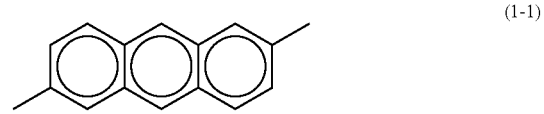

(1-2)

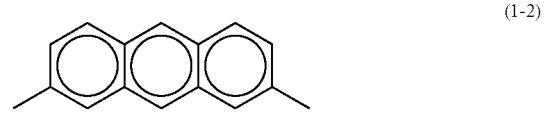

(1-3)

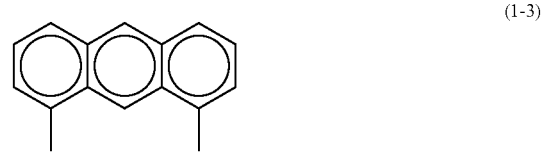

(1-4)

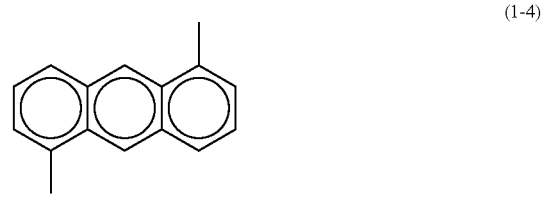

(1-5)

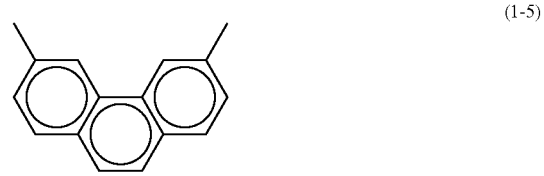

(1-6)

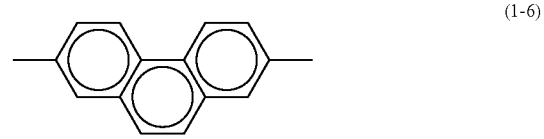

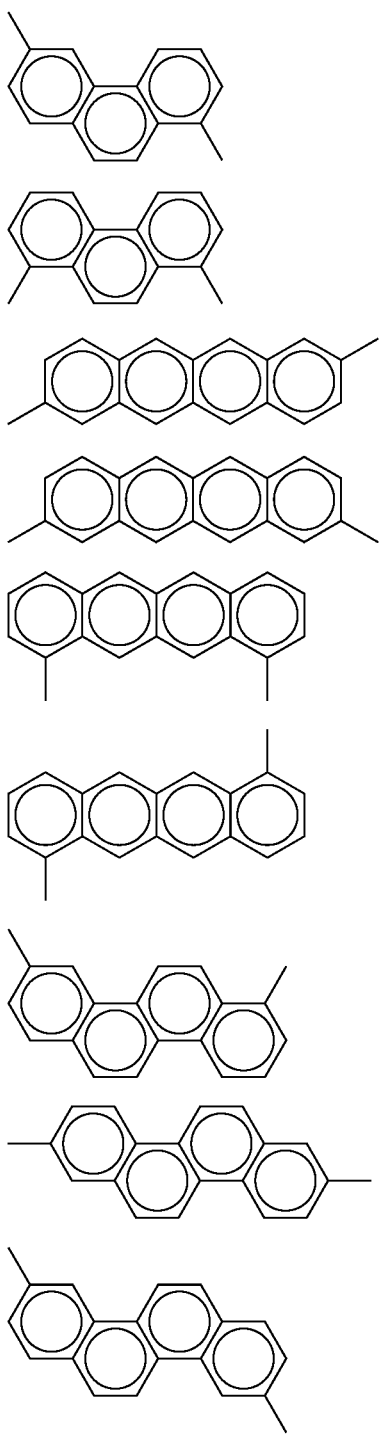

A condensed aromatic compound containing three or more benzene rings as represented by the chemical formulae (1-1) to (1-15) can efficiently absorb light having a wavelength of 330 nm or more and is therefore suitable as the at least one monomer.

The at least one monomer is preferably a compound having the following general formula (2):

$$P^1\text{-}A^1\text{-}P^1 \tag{2}$$

(wherein $P^1$ denotes an acrylate group or a methacrylate group, $A^1$ denotes a condensed aromatic compound having the following chemical formula (2-1) or (2-2), and a hydrogen atom of $A^1$ may be substituted by a halogen group, a methyl group, an ethyl group, or a propyl group).

[Chem. 2]

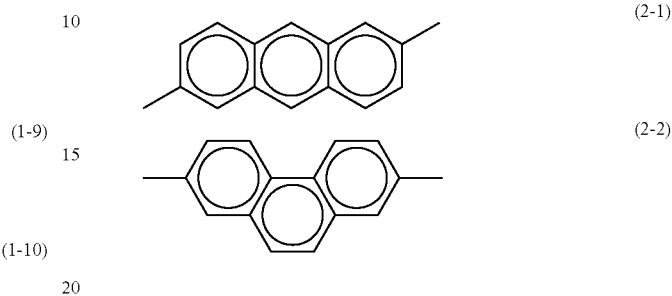

A condensed aromatic compound containing three benzene rings (anthracene or phenanthrene) as represented by the chemical formulae (2-1) and (2-2) can efficiently absorb light having a wavelength of 330 nm or more and is therefore suitable as the at least one monomer.

The liquid crystal layer is preferably a liquid crystal layer of a vertical alignment type. In this case, since the alignment layer is generally not subjected to rubbing treatment, a polymer layer is particularly preferably formed so as to sustain the alignment of liquid crystal molecules.

The liquid crystal layer may contain a liquid crystal material having negative dielectric anisotropy. This is suitable when the liquid crystal layer is a liquid crystal layer of a vertical alignment type. When the liquid crystal layer contains a liquid crystal material having negative dielectric anisotropy, a phenanthrene monomer (a monomer having a phenanthrene skeleton) is superior to an anthracene monomer (a monomer having an anthracene skeleton) in terms of light-use efficiency because the phenanthrene monomer has a higher solubility in the liquid crystal material than the anthracene monomer. Even with an anthracene monomer, use of a small amount of anthracene monomer mixed with another monomer having a high solubility in the liquid crystal material can improve light-use efficiency. When a liquid crystal material having positive dielectric anisotropy is used, both a phenanthrene monomer and an anthracene monomer have a higher solubility than in a liquid crystal material having negative dielectric anisotropy and can be suitably used.

The alignment layer is preferably formed of a polyimide or a polyamic acid. This allows the formation of a liquid crystal layer of a vertical alignment type.

Preferably, the polyimide or the polyamic acid has at least one polymerization-initiating functional group, and the at least one polymerization-initiating functional group has a function of producing a radical through a hydrogen abstraction reaction and initiating a polymerization reaction of the at least one monomer. Thus, the radical derived from a monomer and the polymerization-initiating functional group in the alignment layer coexist in an interface between the liquid crystal layer and the alignment film. This can further improve the reaction probability of a monomer diffused in the liquid crystal layer. Thus, the polymer layer covalently bonded to the alignment layer can be formed in a shorter period of time.

The polymerization-initiating functional group preferably produces a radical through irradiation with light having a wavelength of 330 nm or more.

The polyimide and the polyamic acid preferably have polymerization-initiating functional groups of at least two types and a structure having the following general formula (3) or (4):

[Chem. 3]

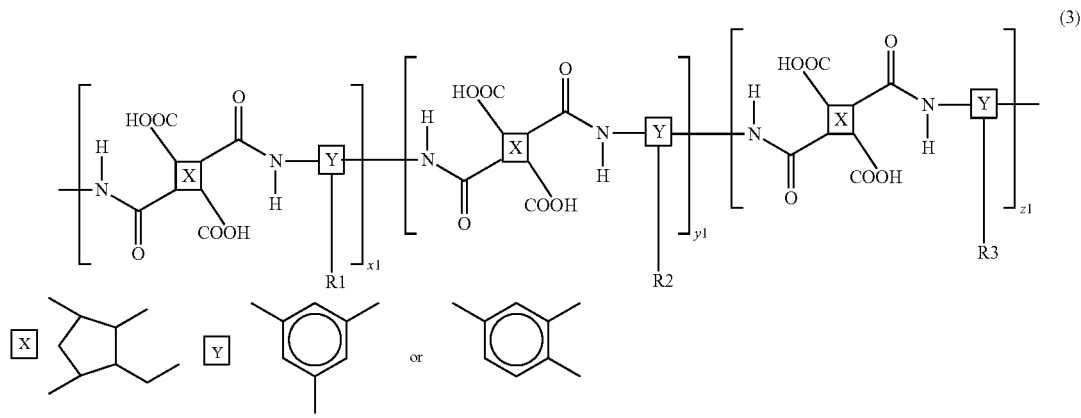

[Chem. 4]

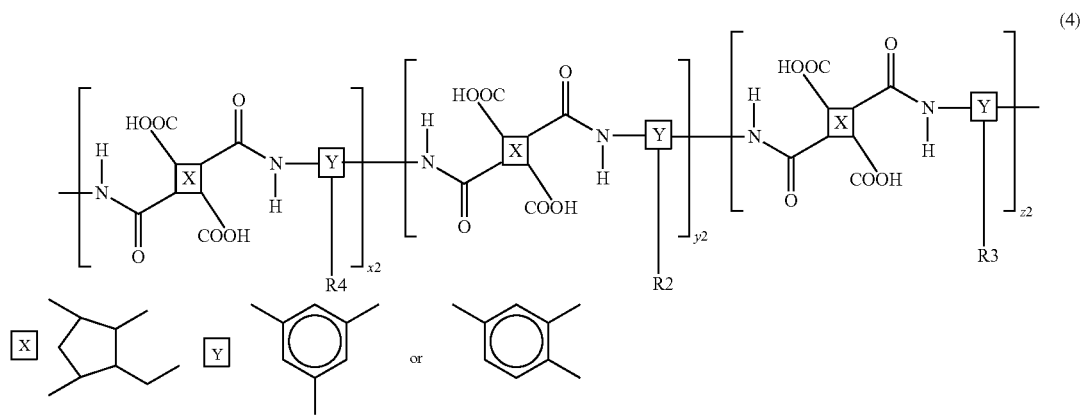

(wherein R1 denotes a photoreactive functional group for aligning liquid crystal molecules of the liquid crystal layer in a predetermined direction through light irradiation, R4 denotes a vertical alignment functional group for vertically aligning liquid crystal molecules, R2 and R3 denote different polymerization-initiating functional groups, x1, x2, y1, y2, z1, and z2 denote the number of repeating units and are at least 1, a predetermined proportion of carboxy groups of each of the repeating units may be imidized, and the repeating units may be randomly arranged). This can suitably provide a function of vertically aligning liquid crystal molecules in the vicinity of the alignment layer and a function of initiating a polymerization reaction.

Preferably, x1, y1, and z1 of the general formula (3) satisfy $0 < y1/(x1+y1+z1) < 0.15$, y1 is substantially equal to z1, x2, y2, and z2 of the general formula (4) satisfy $0 < y2/(x2+y2+z2) < 0.15$, and y2 is substantially equal to z2. This can balance a function of controlling the alignment of liquid crystal molecules in the alignment layer with a function of initiating a polymerization reaction and covalently bonding the alignment layer with the polymer layer.

The different polymerization-initiating functional groups are preferably functional groups derived from an amine and an aromatic ketone. Upon light irradiation, the functional groups derived from an amine and an aromatic ketone can effectively produce radicals and thereby effectively bind the liquid crystal layer with the polymer layer through a covalent bond.

The alignment layer and the polymer layer preferably align the liquid crystal molecules such that liquid crystal molecules of the liquid crystal layer are inclined with respect to a direction normal to a principal surface of the alignment layer in the absence of an applied voltage. This can improve the response characteristics of the liquid crystal display device.

Preferably, the liquid crystal display device includes a plurality of pixels, each of the plurality of pixels including a plurality of domains in which the alignment direction of liquid crystal molecules of the liquid crystal layer varies from one domain to another in the absence of an applied voltage or in the presence of an applied voltage. This can improve the viewing angle characteristics of the liquid crystal display device.

The plurality of domains are preferably four domains. This can improve the viewing angle characteristics of the liquid crystal display device from four directions.

Preferably, the at least one monomer includes a first bifunctional monomer having an anthracene skeleton, and the polymer layer is formed by the polymerization of the first bifunctional monomer and a second bifunctional monomer having no anthracene skeleton. The first bifunctional monomer having an anthracene skeleton can greatly absorb ultraviolet light having a wavelength of 330 nm or more and can improve the rate of polymerization. Use of the first bifunctional monomer can also reduce the residual DC voltage.

The second bifunctional monomer is preferably a bifunctional monomer having a biphenyl skeleton. The bifunctional monomer having a biphenyl skeleton can reduce the variation in tilt angle of liquid crystal molecules adjacent to the polymer layer. Although the bifunctional monomer having a biphenyl skeleton has low light absorption efficiency in a long wavelength band, the bifunctional monomer having a biphenyl skeleton can very effectively reduce the variation in tilt angle. Thus, the first bifunctional monomer having an anthracene skeleton and the bifunctional monomer having a biphenyl skeleton can be used in combination to manufacture a liquid crystal display device that rarely causes burn-in at very high throughput.

When the second bifunctional monomer is a bifunctional monomer having a biphenyl skeleton, in order to effectively reduce the polymerization time and improve burn-in characteristics, the ratio of the first bifunctional monomer to the total of the first bifunctional monomer and the second bifunctional monomer before the polymerization of the first bifunctional monomer and the second bifunctional monomer is preferably 14 mol % or more and 20 mol % or less.

Another aspect of the present invention is a liquid crystal display device (hereinafter also referred to as a second liquid crystal display device according to the present invention) that includes a pair of substrates and a liquid crystal layer between the pair of substrates, wherein at least one of the pair of substrates includes an alignment layer and a polymer layer for controlling the alignment of adjacent liquid crystal molecules, the polymer layer being disposed on the alignment layer, the polymer layer has a structure containing at least three condensed benzene rings, and the alignment layer is covalently bonded to the polymer layer.

In accordance with the second liquid crystal display device of the present invention, a polymerizable monomer that has a structure containing at least three condensed benzene rings can be used as a polymerizable monomer for the formation of the polymer layer. The polymerizable monomer can absorb light in a relatively high wavelength range (for example, light having a wavelength of 330 nm or more) to produce a radical and can be polymerized to form the polymer layer. The polymerizable monomer can therefore be polymerized in a short period of time without using light in a relatively short wavelength range or a polymerization initiator. In the second liquid crystal display device according to the present invention, the alignment layer is covalently bonded to the polymer layer, and elution of polymers, monomers, and oligomers from the polymer layer can be prevented. Thus, the second liquid crystal display device rarely causes burn-in.

The pair of substrates of the second liquid crystal display device according to the present invention may be an array substrate and a color filter substrate. The array substrate includes a plurality of pixel electrodes, which allow the alignment of liquid crystals to be controlled in individual pixels. The color filter substrate includes a plurality of color filters each facing the corresponding pixel electrode of the array substrate, thereby allowing display colors to be controlled in individual pixels.

The alignment layer regulates the inclination direction of liquid crystal molecules of the liquid crystal layer. The inclination direction of liquid crystal molecules refers to a direction along the pretilt angle in the absence of applied voltage or the inclination direction in the presence of applied voltage.

The second liquid crystal display device according to the present invention essentially includes these components and is not particularly limited by another component.

Preferred aspects of the second liquid crystal display device according to the present invention will be described in detail below.

The polymer layer is preferably formed by the polymerization of at least one monomer.

The at least one monomer is more preferably a monomer that can produce a radical through irradiation with light having a wavelength of 330 nm or more, still more preferably 340 nm or more, particularly preferably 430 nm or less.

Other preferred aspects of the second liquid crystal display device according to the present invention may be the preferred aspects of the first liquid crystal display device according to the present invention. In other words, the preferred aspects of the first liquid crystal display device according to the present invention may be applied to the second liquid crystal display device according to the present invention. For example, a preferred aspect of the at least one monomer for the second liquid crystal display device according to the present invention may be the preferred aspect of the at least one monomer for the first liquid crystal display device according to the present invention.

Another aspect of the present invention is a method for manufacturing a liquid crystal display device that includes a pair of substrates and a liquid crystal layer between the pair of substrates. The method includes forming an alignment layer on at least one of the pair of substrates, and forming a polymer layer on the alignment layer, the polymer layer being configured to control the alignment of adjacent liquid crystal molecules, wherein the forming of the polymer layer involves irradiating at least one monomer with light having a wavelength of 330 nm or more to produce a radical and polymerizing the at least one monomer, and the alignment layer is covalently bonded to the polymer layer in the forming of the polymer layer.

A liquid crystal display device manufactured by the method according to this aspect has the characteristics of the first liquid crystal display device according to the present invention.

The method according to this aspect essentially includes these steps and is not particularly limited by another step.

Preferred aspects of this method will be described in detail below.

The forming of the polymer layer preferably involves irradiating the liquid crystal layer with light in the presence of an applied voltage equal to or more than a threshold to perform polymerization. This allows the formation of a polymer layer that can provide liquid crystal molecules with a pretilt angle.

The forming of the polymer layer preferably involves irradiating the liquid crystal layer with light in the absence of an applied voltage equal to or more than a threshold to perform polymerization. In the case that liquid crystal molecules can be aligned in the absence of an applied voltage, a polymer layer that can provide the liquid crystal molecules with a pretilt angle can be formed even if a voltage equal to or more than a threshold is not applied to the liquid crystal layer.

The at least one monomer is preferably a compound having the following general formula (1):

$$P^1\text{-}A^1\text{-}(Z^1\text{-}A^2)_n\text{-}P^2 \quad (1)$$

(wherein $P^1$ and $P^2$ denote the same or different acrylate groups or methacrylate groups, $A^1$ and $A^2$ denote at least one condensed aromatic compound selected from the group consisting of the following chemical formulae (1-1) to (1-15), a hydrogen atom of $A^1$ and $A^2$ may be substituted by a halogen group, a methyl group, an ethyl group, or a propyl group, $Z^1$ denotes COO, OCO, O, CO, NHCO, CONH, or S, or represents direct bonding between A and $A^2$ or between $A^2$ and $A^2$, and n denotes 0, 1, or 2).

[Chem. 5]

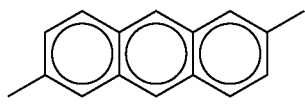 (1-1)

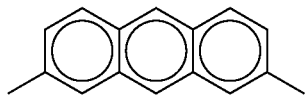 (1-2)

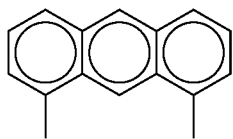 (1-3)

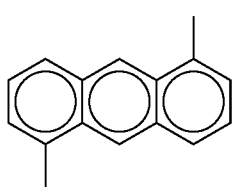 (1-4)

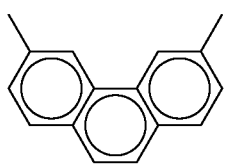 (1-5)

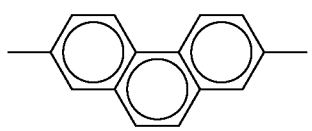 (1-6)

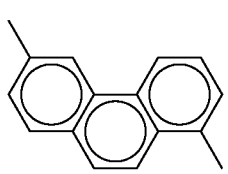 (1-7)

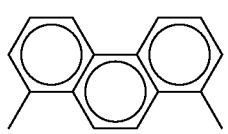 (1-8)

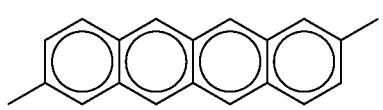 (1-9)

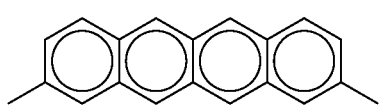 (1-10)

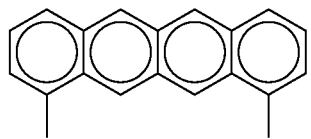 (1-11)

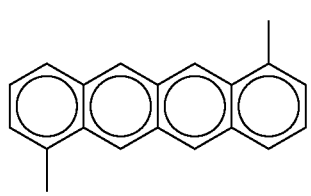 (1-12)

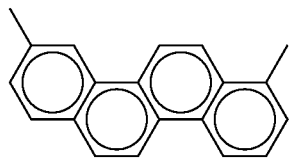 (1-13)

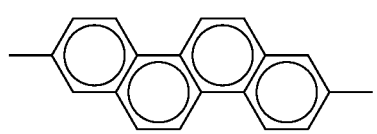 (1-14)

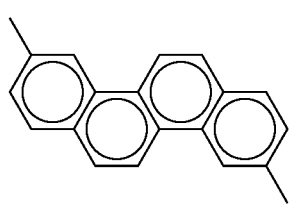 (1-15)

A condensed aromatic compound containing three or more benzene rings as represented by the chemical formulae (1-1) to (1-15) can efficiently absorb light having a wavelength of 330 nm or more and is therefore suitable as the at least one monomer.

The at least one monomer is preferably a compound having the following general formula (2):

$$P^1\text{-}A^1\text{-}P^1 \qquad (2)$$

(wherein $P^1$ denotes an acrylate group or a methacrylate group, $A^1$ denotes a condensed aromatic compound having the following chemical formula (2-1) or (2-2), and a hydrogen atom of $A^1$ may be substituted by a halogen group, a methyl group, an ethyl group, or a propyl group).

[Chem. 6]

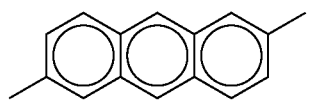 (2-1)

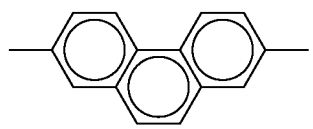 (2-2)

A condensed aromatic compound containing three benzene rings (anthracene or phenanthrene) as represented by the chemical formulae (2-1) and (2-2) can efficiently absorb light having a wavelength of 330 nm or more and is therefore suitable as the at least one monomer.

Preferably, the alignment layer contains a polyamic acid or a polyimide having a plurality of polymerization-initiating functional groups each containing a terminal amine and a terminal aromatic ketone, and a polymerization-initiating functional group having the terminal amine and/or a polymerization-initiating functional group derived from the aromatic ketone is covalently bonded to a polymer of the at least one monomer through the light irradiation in the forming of the polymer layer. The polyimide or the polyamic acid having a functional group derived from an amine and/or an aromatic ketone as a polymerization-initiating functional group can efficiently absorb light having a wavelength of more than 330 nm and efficiently produce a radical.

Preferably, the at least one monomer includes a first bifunctional monomer having an anthracene skeleton, and the forming of the polymer layer involves polymerization of the first bifunctional monomer and a second bifunctional monomer having no anthracene skeleton. The first bifunctional monomer having an anthracene skeleton can greatly absorb ultraviolet light having a wavelength of 330 nm or more and can improve the rate of polymerization. Use of the first bifunctional monomer can also reduce the residual DC voltage.

The second bifunctional monomer is preferably a bifunctional monomer having a biphenyl skeleton. The bifunctional monomer having a biphenyl skeleton can reduce the variation in tilt angle of liquid crystal molecules adjacent to the polymer layer. Although the bifunctional monomer having a biphenyl skeleton has low light absorption efficiency in a long wavelength band, the bifunctional monomer having a biphenyl skeleton can very effectively reduce the variation in tilt angle. Thus, the first bifunctional monomer having an anthracene skeleton and the bifunctional monomer having a biphenyl skeleton can be used in combination to manufacture a liquid crystal display device that rarely causes burn-in at very high throughput.

When the second bifunctional monomer is a bifunctional monomer having a biphenyl skeleton, in order to effectively reduce the polymerization time and improve burn-in characteristics, the ratio of the first bifunctional monomer to the total of the first bifunctional monomer and the second bifunctional monomer before the polymerization of the first bifunctional monomer and the second bifunctional monomer is preferably 14 mol % or more and 20 mol % or less.

Advantageous Effects of Invention

A liquid crystal display device according to the present invention rarely causes burn-in at high throughput.

A method for manufacturing a liquid crystal display device according to the present invention can be used to manufacture a liquid crystal display device that rarely causes burn-in.

DESCRIPTION OF EMBODIMENTS

The present invention will be further described in the following embodiments with reference to the accompanying drawings. However, the present invention is not limited to these embodiments.

Figure 1:
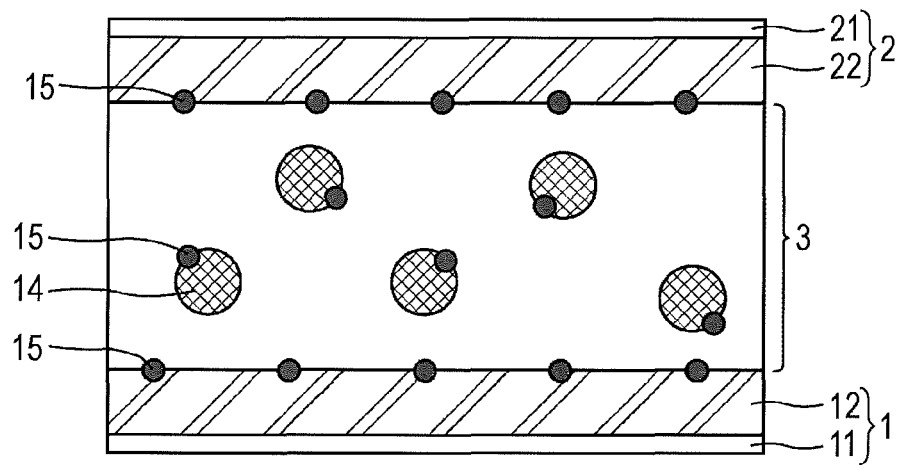
FIG. 1 is a schematic cross-sectional view of a liquid crystal display device according to a first embodiment before a polymer layer polymerization process.
Figure 2:
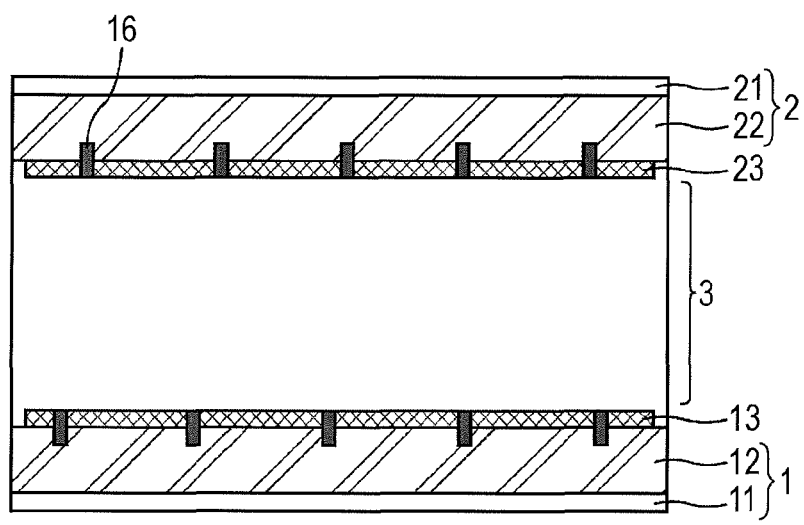
FIG. 2 is a schematic cross-sectional view of the liquid crystal display device according to the first embodiment after the polymer layer polymerization process.

FIGS. 1 and 2 are schematic cross-sectional views of a liquid crystal display device according to a first embodiment. FIG. 1 illustrates the liquid crystal display device before a polymer layer polymerization process, and FIG. 2 illustrates the liquid crystal display device after the polymer layer polymerization process. As illustrated in FIGS. 1 and 2, the liquid crystal display device according to the first embodiment includes an array substrate 1, a color filter substrate 2, and a liquid crystal layer 3 disposed between a pair of the array substrate 1 and the color filter substrate 2. The array substrate 1 includes an insulating transparent substrate, for example, made of glass and a supporting substrate 11 disposed on the transparent substrate. The supporting substrate 11 has various electric wires, pixel electrodes, and a thin-film transistor (TFT). The color filter substrate 2 includes an insulating transparent substrate, for example, made of glass and a supporting substrate 21 disposed on the transparent substrate. The supporting substrate 21 has a color filter, a black matrix, and a common electrode.

The array substrate 1 includes an alignment layer 12 on the supporting substrate 11. The color filter substrate 2 includes an alignment layer 22 on the supporting substrate 21. Surfaces of the alignment layers 12 and 22 can be subjected to alignment treatment, such as rubbing treatment or photoalignment treatment, to make the pretilt angle of liquid crystal molecules vertical or horizontal (initial inclination).

As illustrated in FIG. 1, the liquid crystal layer 3 before a polymer layer polymerization process contains at least one monomer 14. The alignment layers 12 and 22 have a function of initiating a polymerization reaction of the monomer 14, that is, have a polymerization-initiating functional group for producing a radical through a hydrogen abstraction reaction. Upon irradiation with a certain amount of light having a wavelength of 330 nm or more, the alignment layers 12 and 22 and the polymer 14 produce radicals 15. The monomer 14 starts to be polymerized to form polymer layers 13 and 23 on the alignment layers 12 and 22, as illustrated in FIG. 2. The alignment layer 12 is bonded to the polymer layer 13 through a covalent bonding portion 16. The alignment layer 22 is bonded to the polymer layer 23 also through the covalent bonding portion 16.

The monomer 14 efficiently absorbs light having a wavelength of 330 nm or more. Since radicals are produced from the alignment layers 12 and 22 as well as the monomer 14, the monomer 14 diffused in the liquid crystal layer 3 can be polymerized at high reaction probability. Thus, the polymer layers 13 and 23 can be stably formed by performing irradiation once for a short period of time without using a polymerization initiator.

Since the alignment layers 12 and 22 are strongly bonded to the polymer layers 13 and 23 with a covalent bond, undesired elution and reconstruction of the polymer layers 13 and 23 are prevented. Thus, the pretilt angle of liquid crystal molecules is substantially unchanged during use of the liquid crystal display device. This can prevent burn-in resulting from a change in pretilt angle.

Thus, the present embodiment can prevent electrical burn-in and burn-in resulting from a change in pretilt angle at high throughput. More specifically, the present embodiment can improve the voltage holding ratio, the change in tilt angle, and the residual DC voltage.

The polymer layers 13 and 23 can be formed by injecting a composition for forming a liquid crystal layer that contains the monomer 14 and a liquid crystal material between the array substrate 1 and the color filter substrate 2 to form a liquid crystal layer and irradiating the liquid crystal layer 3 with a certain amount of light having a wavelength of 330 nm or more to photopolymerize the monomer 14. Although the polymer layer is formed over the entire surface of the alignment layer in FIG. 2, the polymer layer may be formed as dots or may have variations in thickness.

In the present embodiment, the alignment layers 12 and 22 and the monomer 14 can absorb light and produce a radical to start chain polymerization without a polymerization initiator.

In the present embodiment, the liquid crystal layer 3 is irradiated with light in the presence of an applied voltage equal to or more than a threshold during the polymerization of the monomer, and a polymer thus formed follows liquid crystal molecules aligned in the presence of an applied voltage equal to or more than a threshold. Thus, the resulting polymer layer has a structure that functions as an alignment layer for regulating the initial pretilt angle of the liquid crystal molecules even in the absence of an applied voltage.

In the present embodiment, when the alignment layers 12 and 22 have been subjected to alignment treatment, the liquid crystal layer 3 may be irradiated with light in the absence of an applied voltage equal to or more than a threshold. When the alignment layers 12 and 22 themselves have the characteristics of providing liquid crystal molecules with pretilt alignment, the polymer layers 13 and 23 formed on the alignment layers 12 and 22 can function as films for improving the alignment stability of the alignment layers. An improvement in the alignment regulating force of the alignment layers 12 and 22 results in more uniformly aligned liquid crystal molecules, reduces temporal changes in alignment, and reduces the occurrence of burn-in in display. In the present embodiment, the alignment layers 12 and 22 may be subjected to alignment treatment, and the liquid crystal layer 3 may be irradiated with light in the presence of an applied voltage equal to or more than a threshold to form the polymer layers 13 and 23. This can further improve the alignment stability of the alignment layers 12 and 22 and the polymer layers 13 and 23.

In the present embodiment, the alignment of liquid crystal molecules may be regulated by linear slits, for example, disposed in the pixel electrodes of the supporting substrate 11 or in the common electrode of the supporting substrate 21. In the presence of narrow linear slits in the pixel electrodes and/or the common electrode, liquid crystal molecules align evenly toward the linear slits in the absence of an applied voltage. Thus, a polymer layer for providing the liquid crystal molecules with a pretilt angle can be formed even when a voltage equal to or more than a threshold is not applied to the liquid crystal layer 3.

At least one of polymerizable monomers used in the present embodiment is a monomer that can produce a radical through irradiation with light having a wavelength of 330 nm or more and is a compound having the following general formula (1) or (2).

$$P^1\text{-}A^1\text{-}(Z^1\text{-}A^2)_n\text{-}P^2 \tag{1}$$

(wherein $P^1$ and $P^2$ denote the same or different acrylate groups or methacrylate groups, $A^1$ and $A^2$ denote at least one condensed aromatic compound selected from the group consisting of the following chemical formulae (1-1) to (1-15), a hydrogen atom of $A^1$ and $A^2$ may be substituted by a halogen group, a methyl group, an ethyl group, or a propyl group, $Z^1$ denotes COO, OCO, O, CO, NHCO, CONH, or S, or represents direct bonding between $A^1$ and $A^2$ or between $A^2$ and $A^2$, and n denotes 0, 1, or 2)

[Chem. 7]

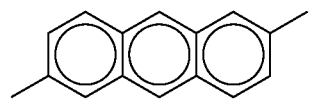 (1-1)

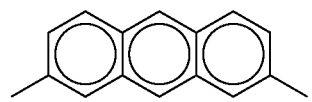 (1-2)

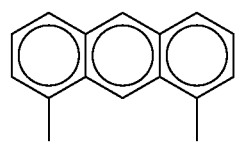 (1-3)

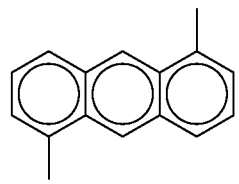 (1-4)

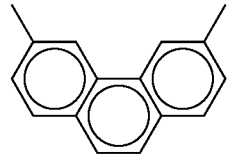 (1-5)

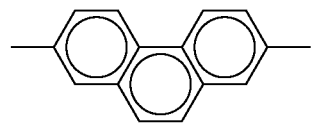 (1-6)

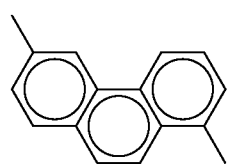 (1-7)

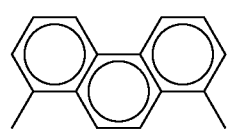 (1-8)

-continued

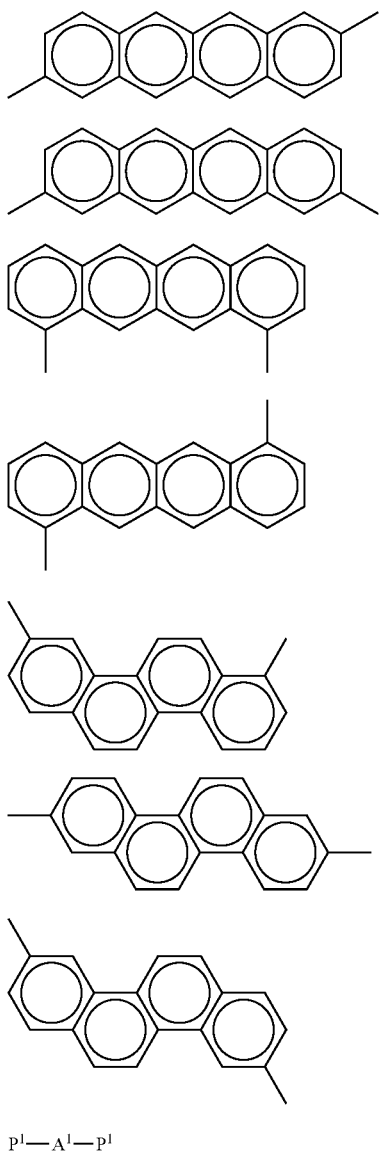

(1-9)

(1-10)

(1-11)

(1-12)

(1-13)

(1-14)

(1-15)

(2)

$P^1—A^1—P^1$ (wherein $P^1$ denotes an acrylate group or a methacrylate group, $A^1$ denotes a condensed aromatic compound having the following chemical formula (2-1) or (2-2),

[Chem. 8]

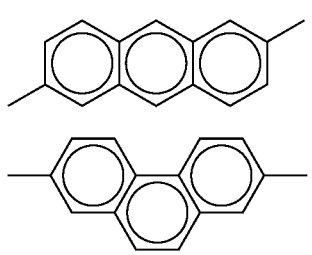

(2-1)

(2-2)

and a hydrogen atom of $A^1$ may be substituted by a halogen group, a methyl group, an ethyl group, or a propyl group.)

These monomers are bifunctional monomers. When mixed with a liquid crystal material, a bifunctional monomer can form a more stable polymer layer than monofunctional monomers. In general, a substrate including an alignment layer on its surface for use in a liquid crystal display device tends to absorb light having a wavelength of less than 330 nm because of the effects of a main chain and a side chain of a polymer in the alignment layer. Thus, use of a monomer that can absorb light having a wavelength of 330 nm or more can increase light-use efficiency. When the monomer is a condensed aromatic compound containing three or more benzene rings, such as anthracene or phenanthrene, which has an absorption wavelength range of more than 330 nm, the monomer can increase the rate of polymerization resulting from ultraviolet irradiation, thereby allowing the formation of a stable polymer layer.

When the monomer is used as a mixture with liquid crystal molecules, the monomer content of the mixture is preferably 0.05% by mass or more and 2.5% by mass or less.

An alignment layer having a polymerization-initiating functional group can be formed, for example, by introducing a polymerization-initiating functional group into a skeleton known as an alignment layer (for example, but not limited to, a polyimide skeleton, a polyamic acid skeleton, a polysiloxane skeleton, or a polyvinyl skeleton). The polymerization-initiating functional group may be introduced after the formation of a skeleton known as an alignment layer or simultaneously with the formation of a skeleton known as an alignment layer (more specifically, a mixture of a monomer component known as an alignment layer and a monomer component having a polymerization-initiating functional group is polymerized). In terms of ease with which the alignment layer having a polymerization-initiating functional group can be formed, the polymerization-initiating functional group is preferably introduced simultaneously with the formation of a skeleton known as an alignment layer.

The alignment layer may be formed of a polyimide or a polyamic acid having a polymerization-initiating functional group and a structure in which the polymerization-initiating functional group is covalently bonded to a monomer component. The polyimide or the polyamic acid may contain a photoreactive functional group for aligning liquid crystal molecules of the liquid crystal layer in a predetermined direction through light irradiation (in other words, providing liquid crystal molecules with a pretilt angle through light irradiation). The photoreactive functional group may be a group known as a material for a photo-alignment layer. Among others, the photoreactive functional group is preferably at least one selected from the group consisting of a cinnamate group, a chalcone group, a tolan group, a coumarin group, and an azobenzene group.

The polymerization-initiating functional group is preferably a group that can produce a radical through irradiation with ultraviolet light having a wavelength of more than 330 nm and 430 nm or less to initiate a polymerization reaction of a monomer, more preferably a group that can initiate a polymerization reaction of the monomer component through irradiation with ultraviolet light having a wavelength of 360 nm or more and 400 nm or less. For example, such a polymerization-initiating functional group is a group having a terminal aromatic ketone or a terminal amine, more specifically, a functional group having a terminal aromatic ketone or a terminal aromatic amine represented by the following general formula (5).

[Chem. 9]

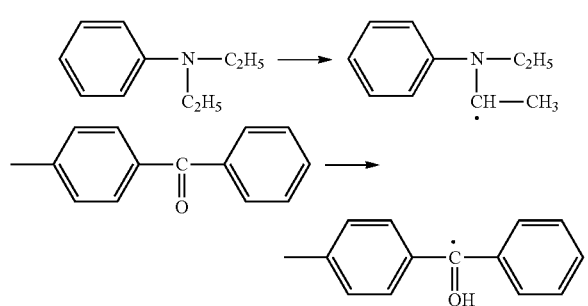

(5)

In the general formula (5), the left side of the arrow indicates the state before ultraviolet irradiation, and the right side of the arrow indicates a radical produced through ultraviolet irradiation.

The alignment layer used in the present embodiment may contain a polyimide or a polyamic acid having a polymerization-initiating functional group. Suitable examples of the polyimide and the polyamic acid include those having a structure represented by the following general formula (3) or (4).

denotes a vertical alignment functional group for vertically aligning liquid crystal molecules, R2 and R3 denote polymerization-initiating functional groups, x1, x2, y1, y2, z1, and z2 denote the number of repeating units and are at least 1, a predetermined proportion of carboxy groups of each of the repeating units may be imidized, and the repeating units may be randomly arranged) Preferably, x1, y1, and z1 of the general formula (3) satisfy $0<y1/(x1+y1+z1)<0.15$, y1 is substantially equal to z1, x2, y2, and z2 of the general formula (4) satisfy $0<y2/(x2+y2+z2)<0.15$, and y2 is substantially equal to z2. This can balance a function of controlling the alignment of liquid crystal molecules in the alignment layer with a function of covalently bonding the alignment layer with the polymer layer.

The constituent materials of the alignment layer represented by the general formulae (3) and (4) preferably have a weight-average molecular weight of 3000 or more and 1000000 or less, more preferably 10000 or more and 100000 or less. In the general formulae (3) and (4), the arrangement of repeating units is not particularly limited and may be a random copolymer or a block copolymer.

Other constituents of the liquid crystal display device according to the present embodiment will be described in detail below.

In the present embodiment, the alignment layers 12 and 22 may be subjected to alignment treatment, such as rubbing

[Chem. 10]

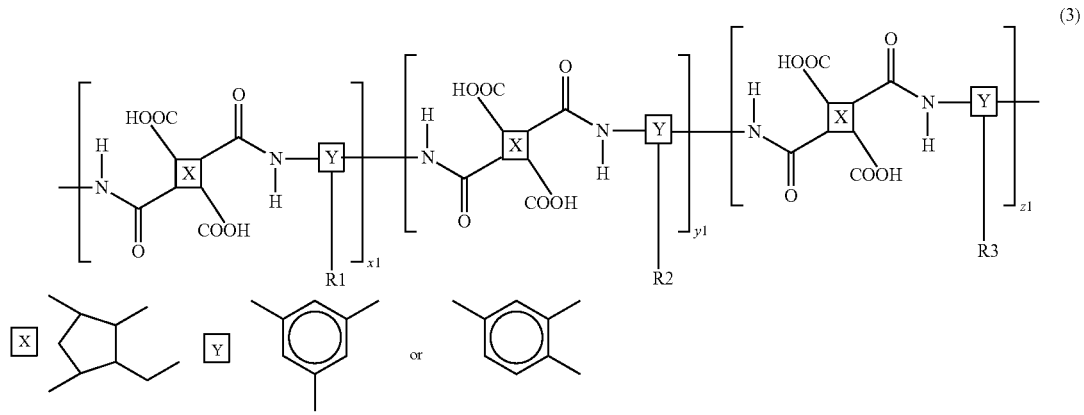

(3)

[Chem. 11]

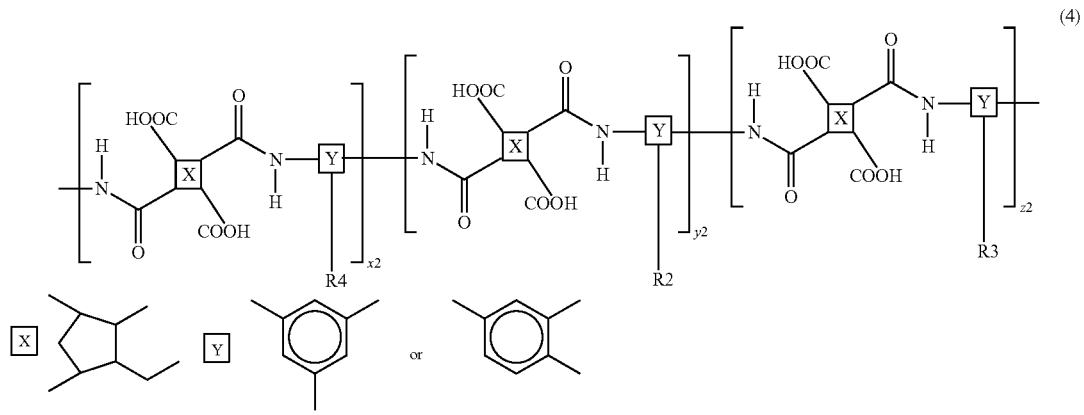

(4)

(wherein R1 denotes a photoreactive functional group for aligning liquid crystal molecules of the liquid crystal layer in a predetermined direction through light irradiation, R4 treatment or photo-alignment treatment. For example, photo-alignment treatment can reduce damage to a TFT of the supporting substrate 11. In the alignment division of pixels, photo-alignment treatment can be more simply performed than rubbing treatment.

The liquid crystal display device according to the present embodiment includes the array substrate 1, the liquid crystal layer 3, and the color filter substrate 2 in this order from the back side of the liquid crystal display device to the observation surface side. A polarizing plate is disposed on the back side of the supporting substrate 11 in the array substrate 1. Another polarizing plate is disposed on the observation surface side of the supporting substrate 21 in the color filter substrate 2. These polarizing plates may be provided with a retardation plate. The polarizing plates may be circularly polarizing plates.

The liquid crystal display device according to the present embodiment may be of a transmission type, a reflection type, or a reflection and transmission type. The liquid crystal display device according to the first embodiment of a transmission type or a reflection and transmission type further includes a backlight. The backlight is disposed on the back side of the array substrate 1 such that light passes through the array substrate 1, the liquid crystal layer 3, and the color filter substrate 2 in this order. In the liquid crystal display device according to the first embodiment of a reflection type or a reflection and transmission type, the array substrate 1 further includes a reflector plate for reflecting extraneous light. In at least a region that uses reflected light for display, the polarizing plate of the color filter substrate 2 must be a circularly polarizing plate including a λ/4 retardation plate.

The liquid crystal display device according to the present embodiment may be in the form of color-filter-on-array, which includes a color filter in the array substrate 1. The liquid crystal display device according to the first embodiment may be a monochrome display device without a color filter.

When the alignment treatment directions are altered with a pair of substrates such that the alignment treatment directions are perpendicular to each other, a 4D-reverse twisted nematic (RTN) mode in which a pixel is divided into four domains can greatly improve the viewing angle. The 4D-RTN requires precise pretilt control. In the liquid crystal display device according to the first embodiment, the polymer layer disposed on the alignment layer can provide stable pretilt, thereby achieving sufficient alignment stability even with the 4D-RTN.

The present embodiment can be applied to any liquid crystal display device that includes an alignment layer and a polymer layer for aligning liquid crystal molecules in a predetermined direction irrespective of the type of liquid crystal molecules, the type of alignment layer, and the type of method for driving the liquid crystal molecules. More specifically, for example, liquid crystal molecules and alignment layers for use in a vertical alignment (VA) mode, a twisted nematic (TN) mode, an in-plane switching (IPS) mode, an optically compensated bend (OCB) mode, and an FFS mode can be widely used. A vertical alignment mode is more preferred. In the vertical alignment mode, since the alignment layer is generally not subjected to rubbing treatment, a polymer layer is particularly preferably formed so as to sustain the alignment of liquid crystal molecules.

In the liquid crystal display device according to the present embodiment, the component analysis of the alignment layer, the component analysis of a monomer for the formation of a polymer layer (polymerizable monomer) in the polymer layer, the monomer (polymerizable monomer) content of the liquid crystal layer, and the abundance ratio of the monomer (polymerizable monomer) in the polymer layer can be determined by disassembling the liquid crystal display device (for example, a liquid crystal television (TV) or a digital information display (DID)) and performing chemical analysis utilizing nuclear magnetic resonance (NMR), Fourier transform infrared spectroscopy (FT-IR), or mass spectrometry (MS).

EXAMPLE 1

In Example 1, a liquid crystal cell relating to a UV2A technology was manufactured using a polyamic acid alignment layer material having photo-alignment ability.
(1) Production Example of Alignment Layer Material
1. Synthesis of Raw Material Monomer (A)

One example of the synthesis of a diamine monomer (raw material monomer (A)) containing a photopolymerization initiator (polymerization initiator) will be described below. The term "M.W." in a reaction formula refers to the molecular weight of each compound.
(Process A)

First, thionyl chloride was added dropwise to a benzene solution (20 mL) containing 0.96 g (5 mmol) of 4-(diethylamino)benzoic acid (a compound (10-2) in the following reaction formula) and was allowed to react at room temperature in a nitrogen atmosphere, yielding 4-(diethylamino)benzoic acid chloride (a compound (10-3) in the following reaction formula, 4.65 mmol, yield 93%).

A benzene solution (5 mL) of 0.53 g (2.5 mmol) of 4-(diethylamino)benzoic acid chloride thus produced was then added dropwise to a benzene (20 mL) solution containing 0.42 g (2.5 mmol) of ethyl 4-hydroxybenzoate ((10-1) in the following reaction formula) and 0.5 g (5 mmol) of triethylamine at room temperature in a nitrogen atmosphere. The solution was allowed to react for two hours at room temperature. After the completion of the reaction, Impurities were extracted with water, and purification with column chromatography (developing solvent: toluene/ethyl acetate (4/1)) yielded 0.733 g (yield 86%) of a target compound (a compound (10-4) in the following reaction formula).

[Chem. 12]

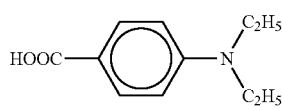

(10-2) (M.W. 193)

-continued

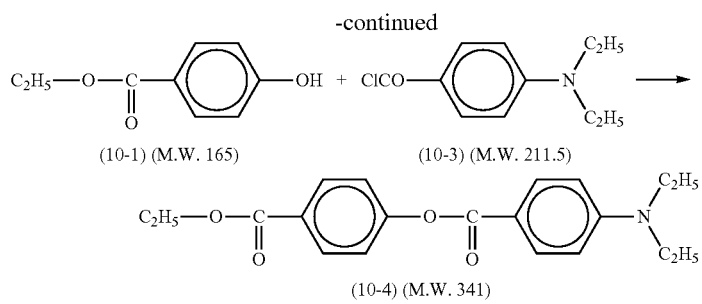

(10-1) (M.W. 165)    (10-3) (M.W. 211.5)

(10-4) (M.W. 341)

(Process B)

Aqueous sodium hydroxide and subsequently hydrochloric acid were added dropwise to a tetrahydrofuran (THF)/methanol mixed solution (20 mL) containing 0.7 g (2 mmol) of the compound (10-4) and were stirred for one hour to yield a carboxylic acid compound (a compound (10-5) in the following reaction formula) (0.6 g, 1.9 mmol).

[Chem. 13]

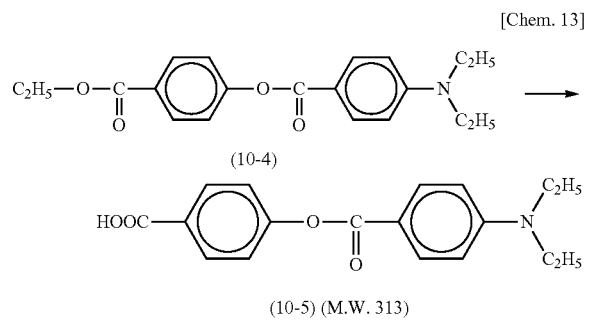

(10-4)

(10-5) (M.W. 313)

The processes A and B were performed more than once (n times) to synthesize a compound (10-6) in the following reaction formula. More specifically, the carboxylic acid compound (the compound (10-5)) and ethyl 4-hydroxybenzoate (the compound (10-1)) were subjected to a condensation reaction in accordance with the processes A and B to synthesize the compound (10-6, n=2). This compound and ethyl 4-hydroxybenzoate were subjected to a condensation reaction to synthesize the compound (10-6, n=3).

[Chem. 14]

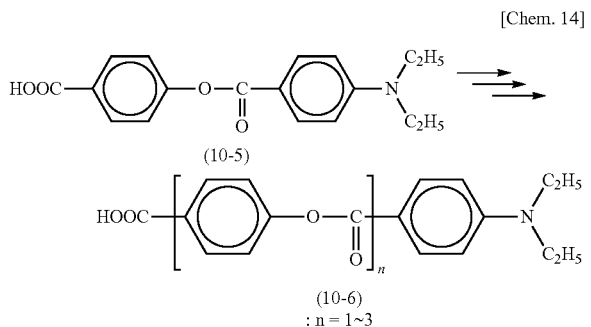

(10-5)

(10-6)
: n = 1~3

3 g of nitrophenylacetic acid (a compound (10-7) in the following reaction formula) was dissolved in 20 mL of THF. A 1.9 M toluene solution (7 mL) of borane dimethyl sulfide was added dropwise to the THF solution. After leaving the solution to stand overnight at room temperature, a reaction product was extracted with 10 mL of 50% by weight aqueous methanol. An extracted chloroform layer was washed with 5% by weight aqueous sodium bicarbonate and then washed with water. This operation was repeatedly performed until the reaction product was not extracted into the chloroform layer, thereby concentrating the reaction product.

The resulting liquid was then dissolved in 20 mL of chloroform and was purified by alumina column chromatography. A distillate from the chromatography was concentrated. A toluene/n-heptane solution (volume ratio: 6/4) was added to the concentrate to separate a component hot-extracted at 70° C. Decantation and cooling of an upper layer component yielded 2,4-dinitrophenylethanol (a compound (10-8) in the following reaction formula) (1.2 g, yield 42.7%).

0.4 g of the compound (10-8) was dissolved in 8 mL of Solmix AP-I (trade name, manufactured by Japan Alcohol Trading Co., Ltd.). 0.06 g of Raney Ni was added to the solution. The solution was placed in an autoclave. The reaction system was purged with hydrogen and was left to stand overnight at room temperature at a pressure of 0.4 MPa. After termination of the reaction was checked by high-performance liquid chromatography (HPLC), the reaction solution was filtered through Celite (product name, manufactured by Celite Corp.). The filtrate was concentrated until no distillate was observed. A crude liquid thus obtained was distilled under reduced pressure, yielding 0.69 g (yield 80%) of 2,4-diaminophenylethanol (a compound (10-9) in the following reaction formula).

0.6 g of the compound (10-9) was dissolved in 5 mL of acetone. t-butoxycarbonyl anhydride (1.8 g/THF 5 mL) was added dropwise to the solution. After the addition, the solution was heated to a reflux temperature and was left to stand overnight. After the completion of the reaction, the reaction solution was concentrated and dried, yielding a Boc compound (a compound (10-10) in the following reaction formula) (0.13 g, yield 94%). The Boc compound is the compound (10-9) having an amino group protected by Boc.

[Chem. 15]

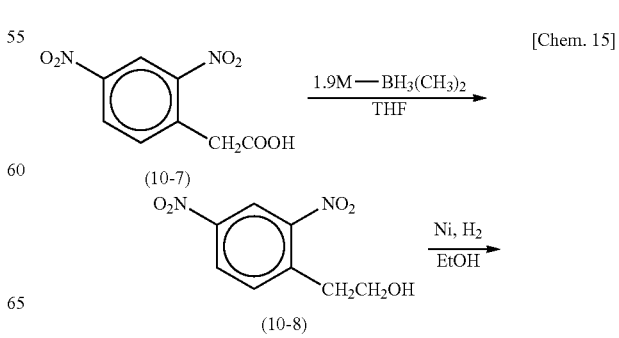

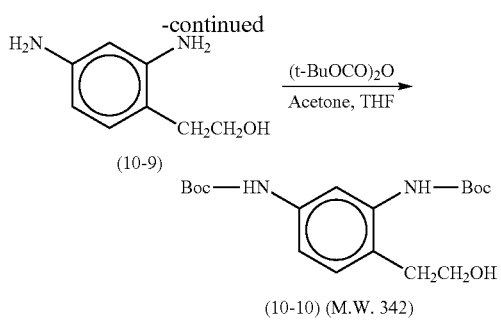

The compound (10-10) and the compound (10-6) were then subjected to a condensation reaction to synthesize a compound (10-11) in the following reaction formula. In order to deprotect the Boc compound, the compound (10-11) was dissolved in methylene chloride. Fractions of trifluoromethanesulfonic acid tin (II) $(Sn(OTf)_2)$ were added to the solution at 0° C. After a reaction at room temperature, 5% by weight aqueous $NaHCO_3$ solution was added to neutralize the solution. After washing with water to neutral, an organic layer was dried over anhydrous magnesium sulfate and was filtered through Celite. The filtrate was concentrated to yield a target raw material monomer (A) (a compound (10-12) in the following reaction formula).

[Chem. 16]

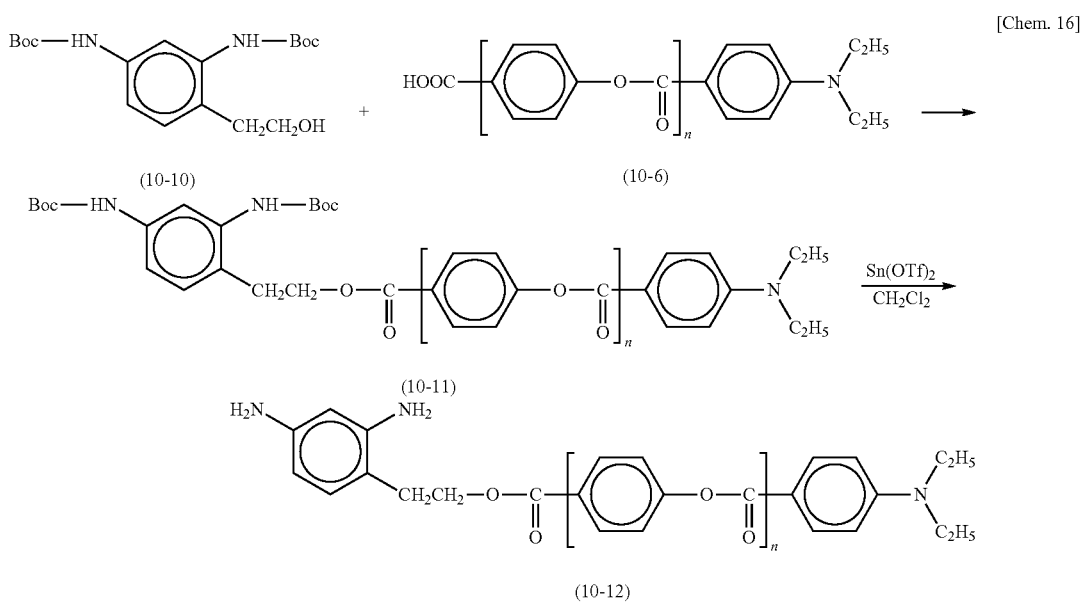

2. Synthesis of Raw Material Monomer (B)

The other diamine monomer containing a photopolymerization initiator (a polymerization-initiating functional group) in a side chain (a raw material monomer (B): the following compound (10-13)) can be synthesized in the same manner as the raw material monomer (A) except that the starting material is the following compound (10-14) instead of the compound (10-2).

[Chem. 17]

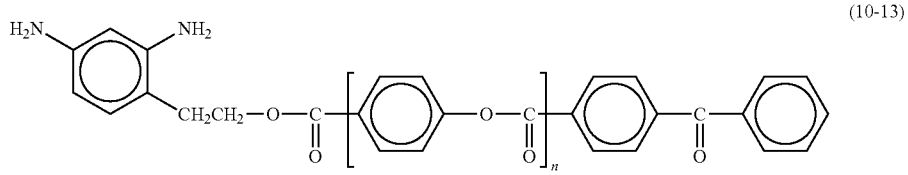

3. Production of Alignment Layer Material 0.09 mol of the following diamine compound (10-16) having a photoreactive functional group, 0.005 mol of the compound (10-12) (the monomer raw material (A)), and 0.005 mol of the compound (10-13) (the monomer raw material (B)) were dissolved in γ-butyrolactone to prepare a monomer solution for an alignment layer material. 0.10 mol of an acid anhydride (10-15) in the following reaction formula was added to the monomer solution and was allowed to react at 60° C. for 12 hours, yielding a polyamic acid (10-20) having a random structure represented by the following chemical formula. A terminal methyl group of the following diamine compound (10-16) may be replaced by a fluoromethyl group ($-CF_3$, $-CHF_2$, or $-CH_2F$) without compromising the performance of the alignment layer.

[Chem. 18]

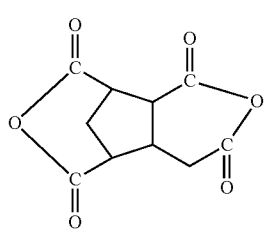

(10-15)

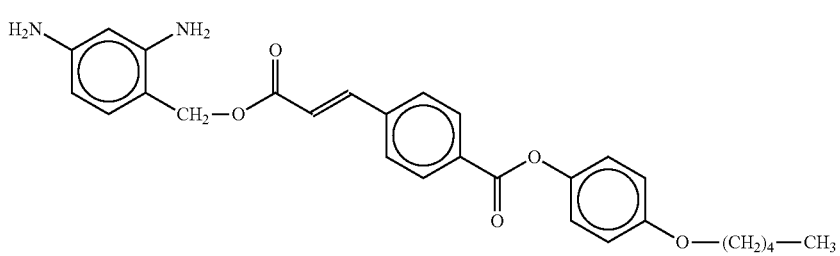

(10-16)

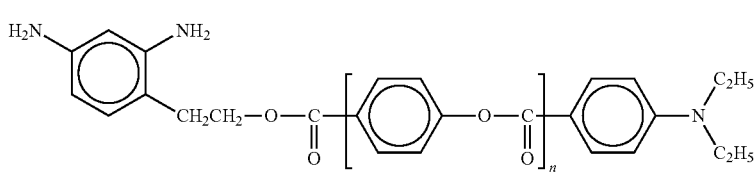

(10-12)

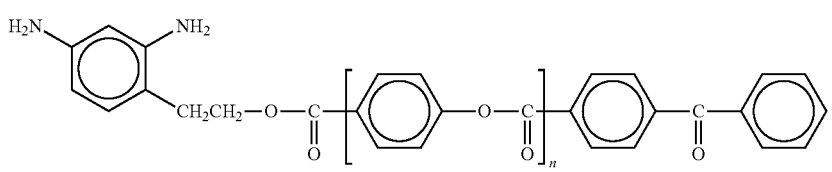

(10-13)

[Chem. 19]

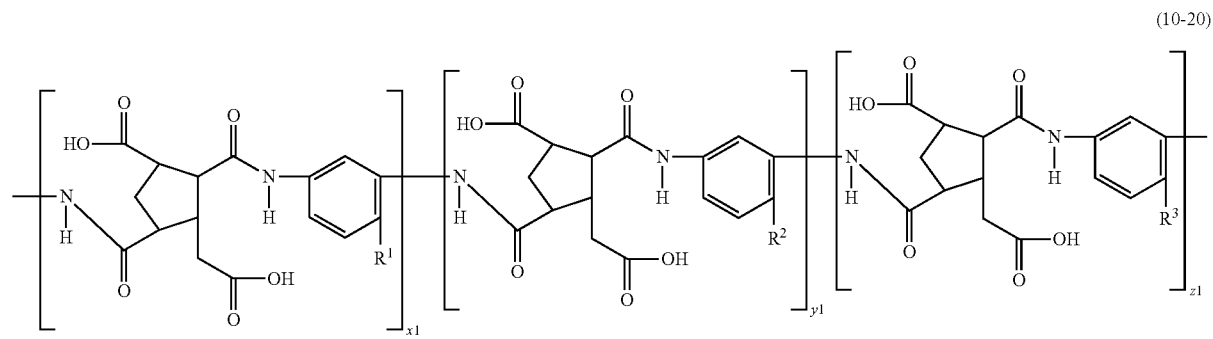

(10-20)

-continued

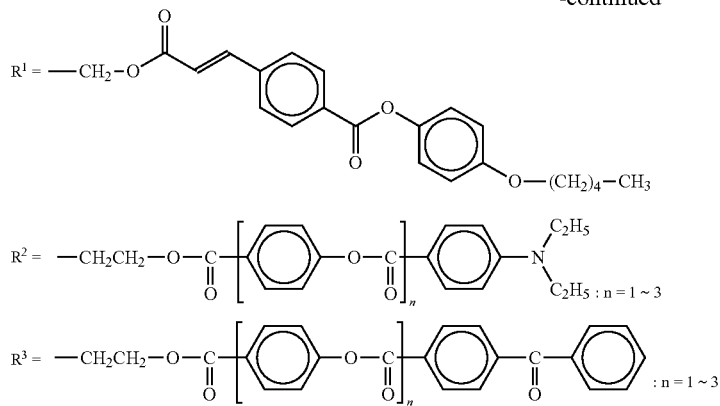

The contents of diamine compounds having an initiator function (10-12) and (10-13) are 10 mol % of the polyamic acid having a photoreactive functional group (10-20).

The molar ratio of the compound (10-16), the compound (10-12), and the compound (10-13) for use in a reaction could be changed to produce the polyamic acid having a photoreactive functional group (10-20) in which each of the compound (10-12) and the compound (10-13) constituted 0, 5, or 15 mol %.

Diamine monomers having a photoreactive functional group in their side chains represented by the following chemical formulae (5-1) to (5-24) may be used as diamine compounds having a photoreactive functional group. Acid anhydrides represented by the following chemical formulae (6-1) to (6-7) may be used as acid anhydrides.

[Chem. 20]

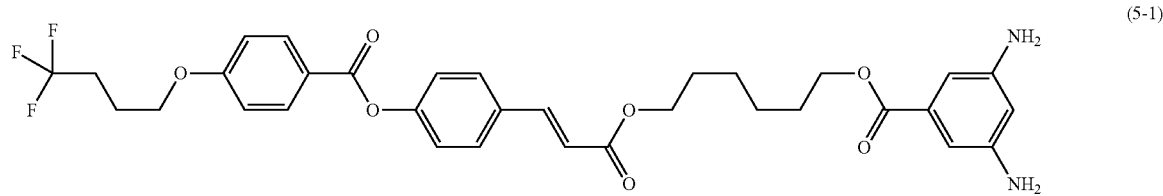

(5-1)

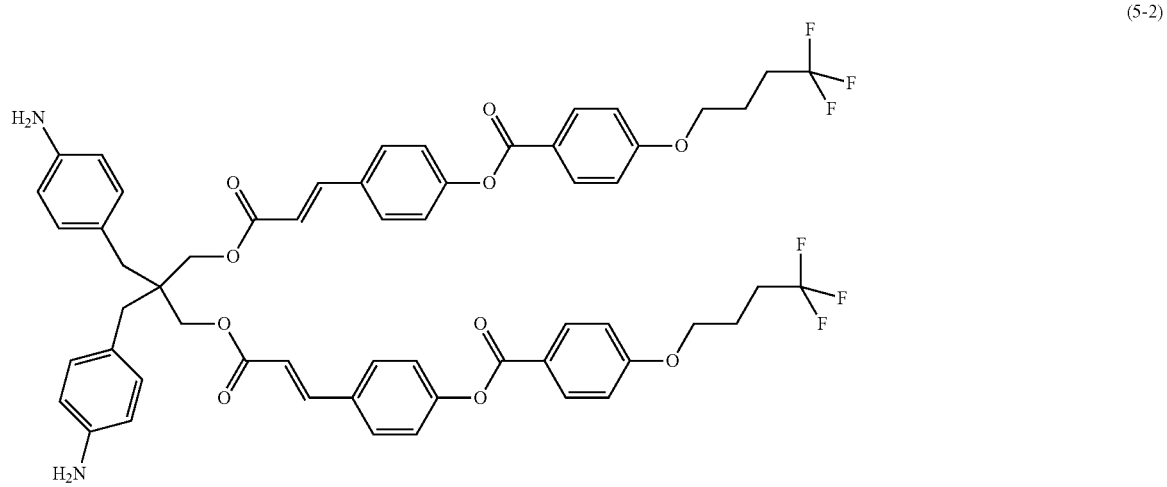

(5-2)

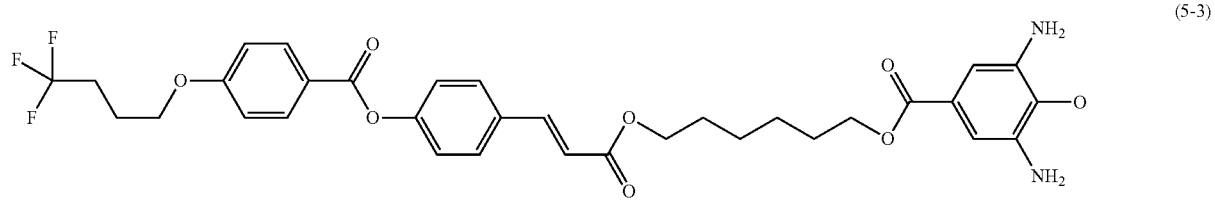

(5-3)

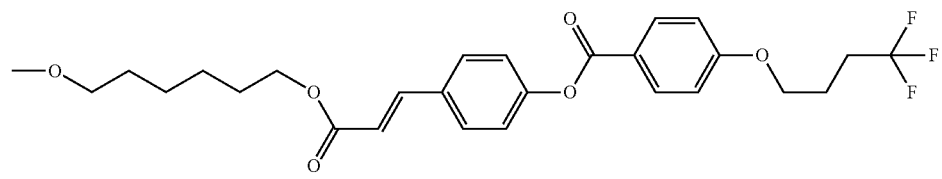
(5-4)
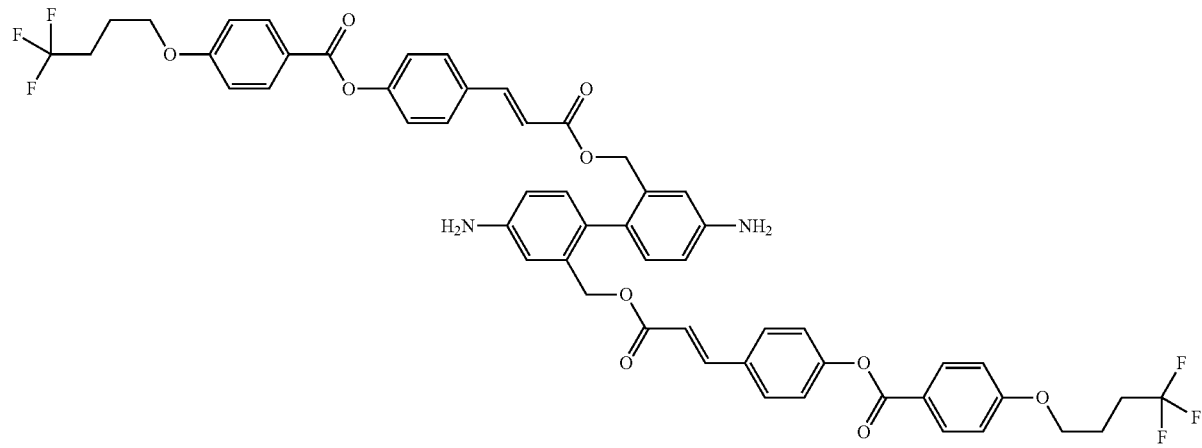
[Chem. 21]
(5-5)
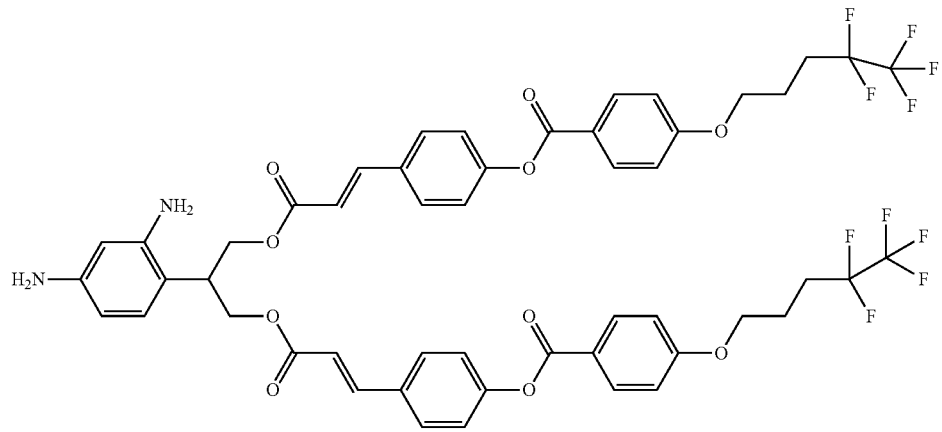
(5-6)
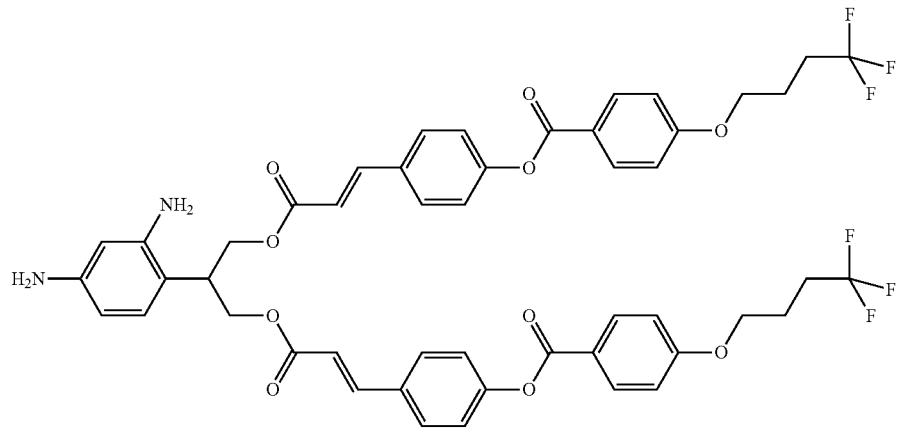

(5-7)
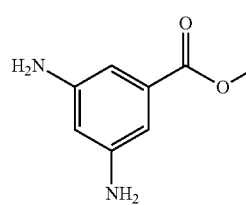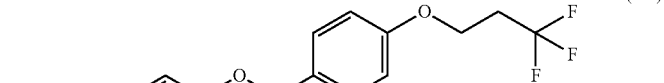
(5-8)
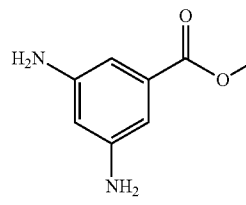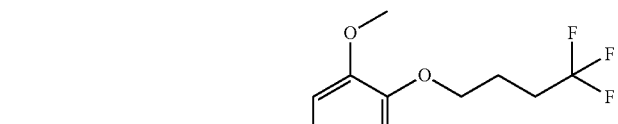
(5-9)
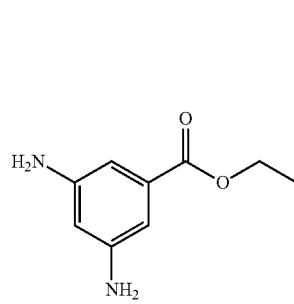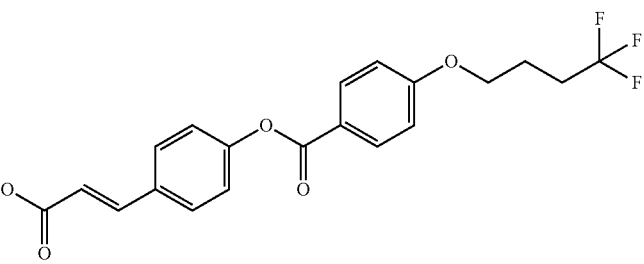
(5-10)
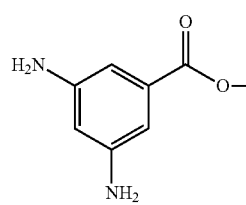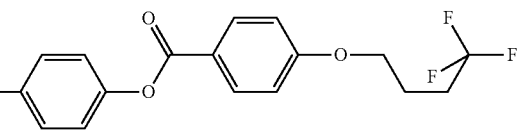
[Chem. 22]
(5-11)
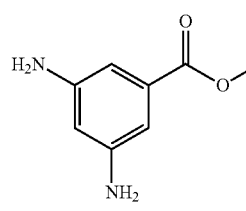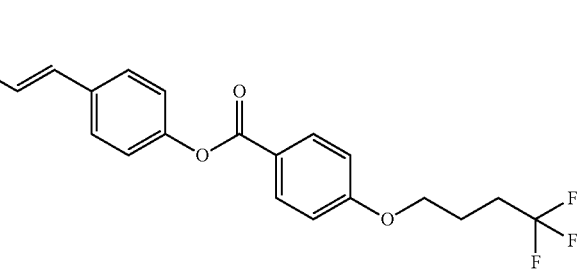

-continued
(5-12)
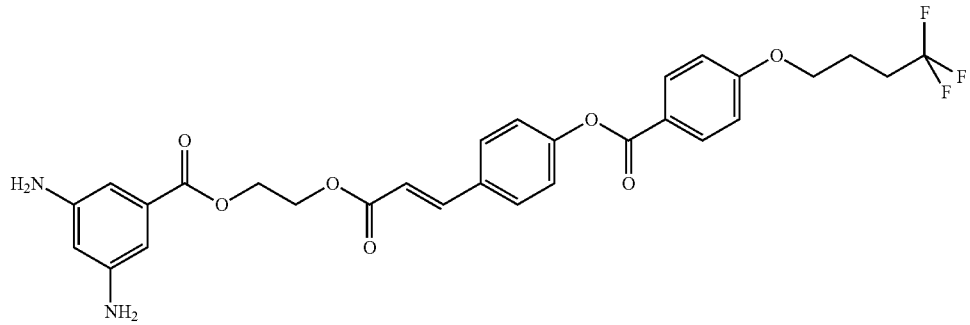
(5-13)
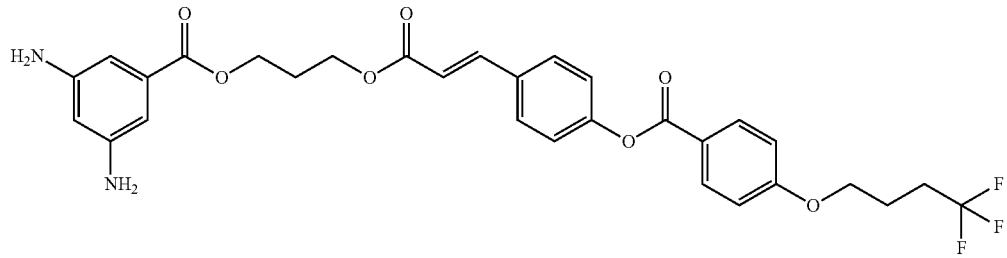
(5-14)
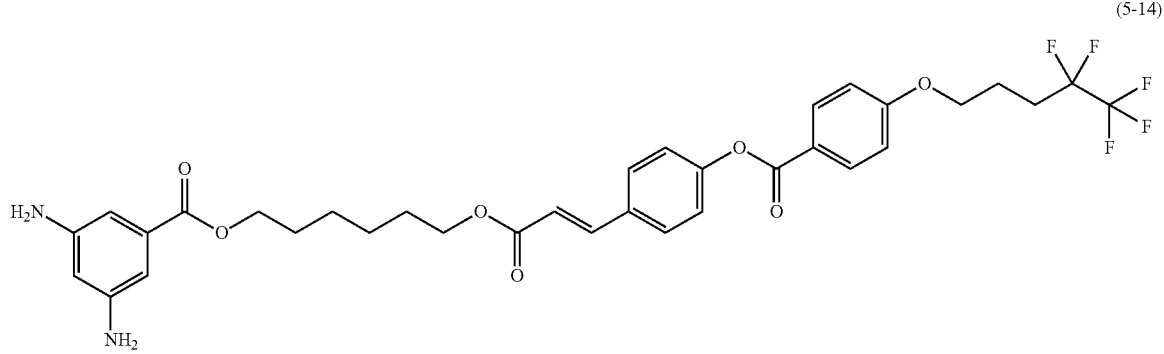
(5-15)
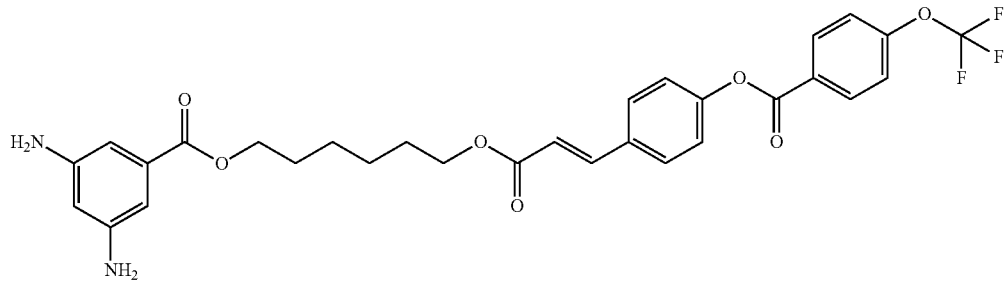
(5-16)
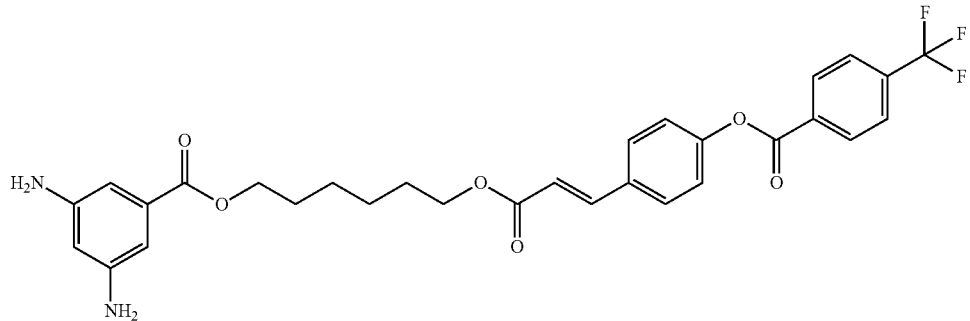

[Chem. 23]
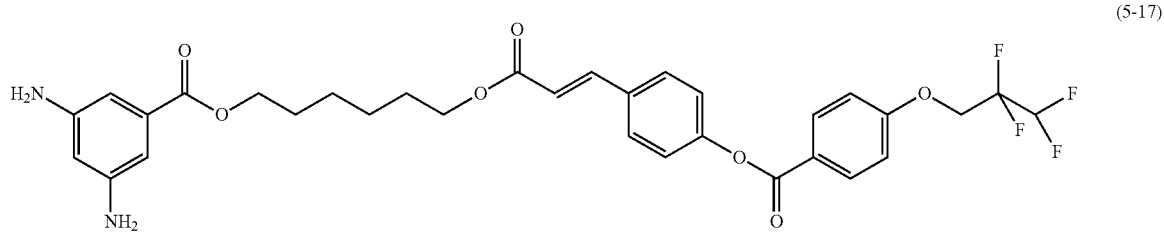
(5-17)
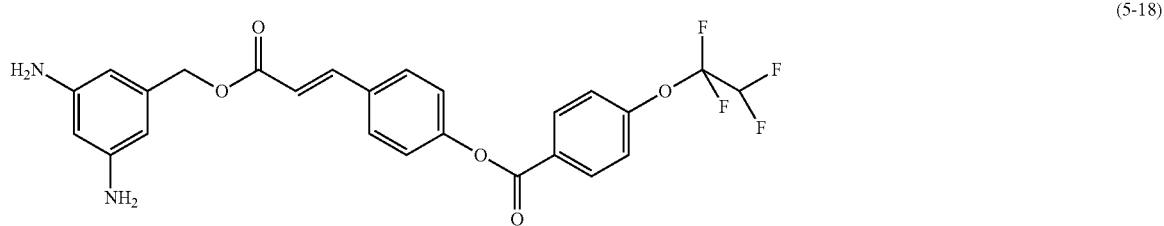
(5-18)
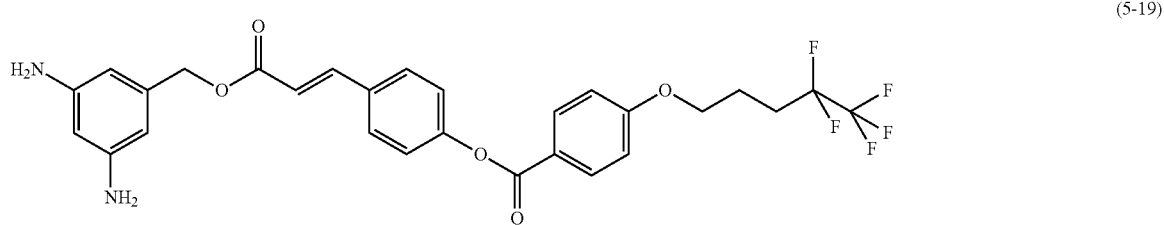
(5-19)
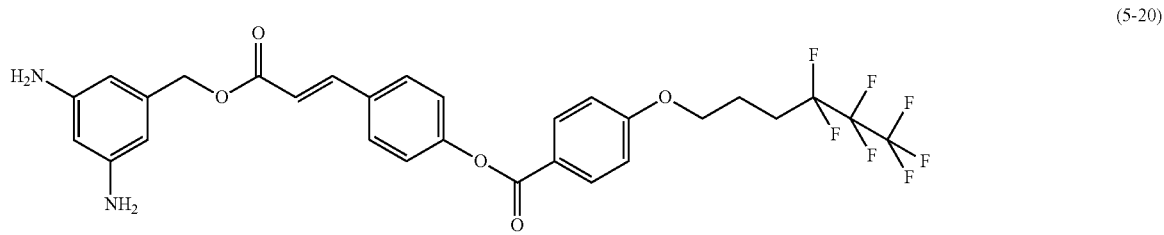
(5-20)
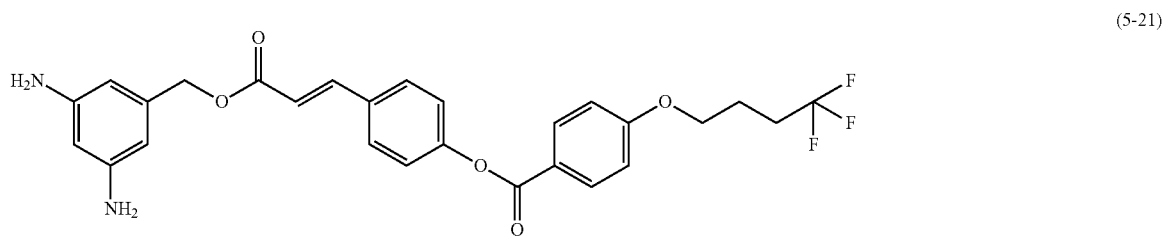
(5-21)
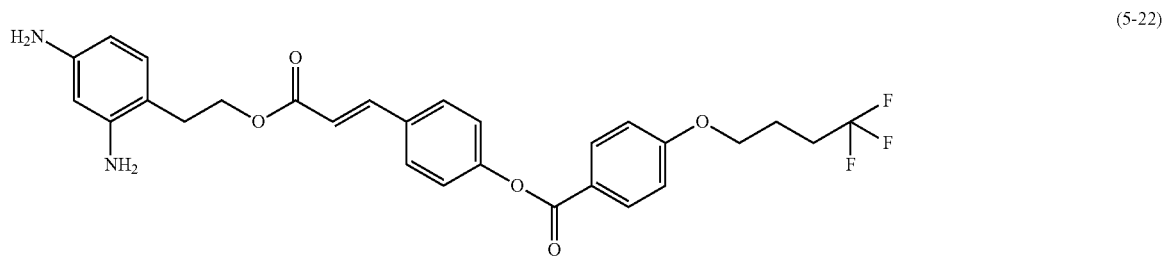
(5-22)

(5-23)

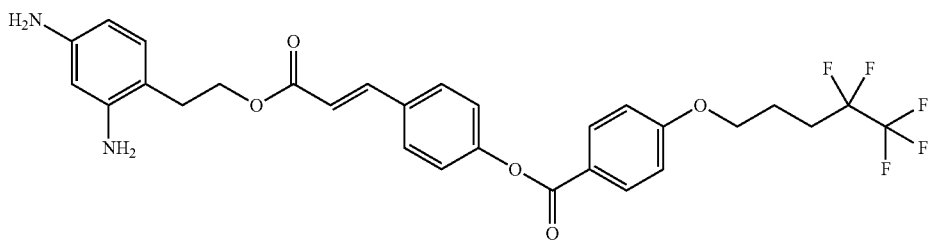

(5-24)

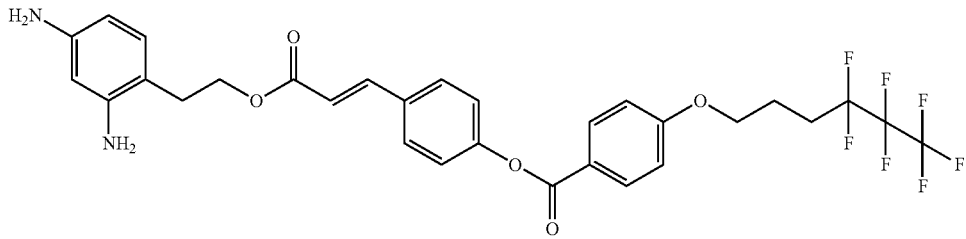

[Chem. 24]

(6-1) 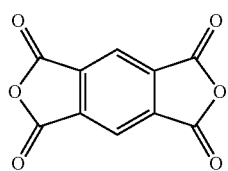

(6-2) 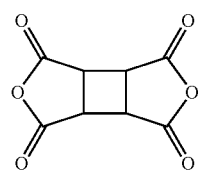

(6-3) 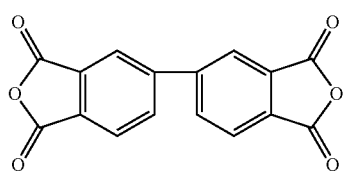

(6-4) 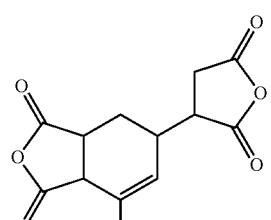

(6-5) 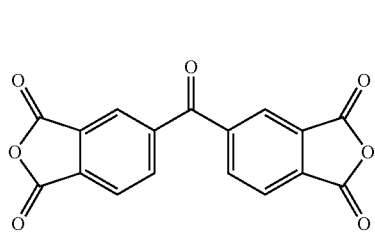

(6-6) 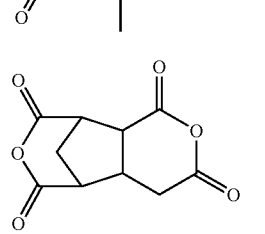

(6-7) 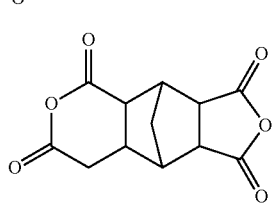

(2) Manufacturing Example of Liquid Crystal Cell

A counter electrode was formed on a principal surface of one of a pair of glass substrates. A vertical alignment layer composed of the polyamic acid having a photoreactive functional group (10-20) was formed on the counter electrode. A pixel electrode was formed on the other glass substrate. A vertical alignment layer composed of the polyamic acid having a photoreactive functional group (10-20) was formed on the pixel electrode. Each of the glass substrates was irradiated with linearly polarized light in an oblique direction to perform photo-alignment treatment.

A seal was applied to the periphery of one of the glass substrates, and beads were spread over the surface of the other glass substrate on which the alignment layer had been formed. The glass substrates were bonded together. Liquid crystals having negative dielectric anisotropy were injected between the glass substrates. In addition to liquid crystal molecules, the following bifunctional monomer (19), which served as a polymer layer raw material, was mixed with and dissolved in the liquid crystals. After the injection of the liquid crystals, heating at 130° C. and quenching were performed. The liquid crystal cell was then irradiated with ultraviolet light having a wavelength of 365 nm (FHF-32BLB manufactured by Toshiba Lighting & Technology Corp.) for one hour, thereby polymerizing the bifunctional monomer (19). During the polymerization reaction, no voltage was applied to the liquid crystal cell.

[Chem. 25]

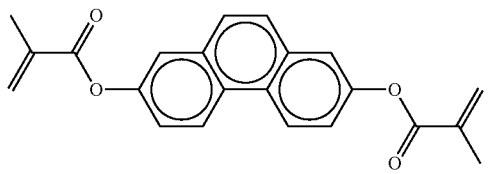

(19)

The polyamic acid having a photoreactive functional group (10-20) described above was the compound (10-20) in which the compounds (10-12) and (10-13) constituted 0, 5, 10, or 15 mol %. Liquid crystal cells manufactured using the polyamic acid having a photoreactive functional group (10-20) in which the compounds (10-12) and (10-13) constituted 0 mol % serve as comparative examples of the present invention. The bifunctional monomer (19) content was fixed at 0.6% by weight.

(3) Measurements of Characteristics of Liquid Crystal Cells

A liquid crystal cell thus manufactured and placed between polarizing plates was placed on a backlight and was energized at 10 V at 30 Hz for 100 hours. After energization on the backlight, the voltage holding ratio (VHR), the residual DC voltage (rDC), the change in tilt angle (Δtilt), and the residual monomer content were measured. Table 1 shows the results.

[Voltage Holding Ratio]

Measurements were performed with a liquid crystal material characteristics measurement system model 6254 manufactured by Toyo Corp. More specifically, after electrical charging between electrodes at 70° C. at an applied voltage of 1 V for 60 µs, the electric potential between the electrodes was measured for an open period (a period of no applied voltage) of 16.61 ms to determine the ratio of retained electric charges.

[Change in Tilt Angle]

The change in tilt angle was measured by a crystal rotation method using OMS-AF2 manufactured by Chuo Precision Industrial Co., Ltd.

[Residual DC Voltage]

The residual DC voltage was determined by a flicker reduction method [operation I] described in WO2007/141935. More specifically, a direct-current offset voltage of 2 V was applied to a liquid crystal cell for 10 hours. The liquid crystal cell was then driven with a rectangular wave voltage. The direct-current offset voltage was controlled so as to remove flickers. The direct-current offset voltage was considered to be the residual DC voltage. The measurement was performed in an oven at 50° C. with an in-house apparatus that included a generator, a photomultiplier, an oscilloscope, and a computer for controlling these devices.

[Residual Monomer Content]

The peak intensity of a monomer was measured by liquid chromatography or gas chromatography before and after polymerization. The residual monomer content was determined from the peak intensity ratio.

TABLE 1

| | Initiator introduced (mol %) | | | |
|---|---|---|---|---|
| | m = 0 | m = 5 | m = 10 | m = 15 |
| VHR (%) | 98.5 | 99.3 | 99.3 | 99.3 |
| rDC (mV) | 30 | 0 | 0 | 0 |
| Δtilt (degrees) | 0.06 | 0.03 | 0.03 | 0.03 |
| Residual monomer (%) | 0.1 or less | 0.1 or less | 0.1 or less | 0.1 or less |

Liquid crystal cells were manufactured such that the bifunctional monomer (19) constituted 0%, 0.3%, 0.6%, or 1.0% by weight while the contents of the compound (10-12) and the compound (10-13) in the alignment layer material were fixed at 10 mol %. A liquid crystal cell in which the bifunctional monomer (19) constituted 0% by weight, that is, a liquid crystal cell manufactured without using the bifunctional monomer (19) serves as a comparative example of the present invention. Table 2 shows the measurement results of the voltage holding ratio, the change in tilt angle, the residual DC voltage, and the residual monomer content of the liquid crystal cells.

TABLE 2

| | Monomer concentration (% by weight) | | | |
|---|---|---|---|---|
| | 0 | 0.3 | 0.6 | 1.0 |
| VHR (%) | 94.5 | 99.2 | 99.3 | 99.3 |
| rDC (mV) | 500 | 10 | 0 | 0 |
| Δtilt (degrees) | 0.15 | 0.03 | 0.03 | 0.03 |
| Residual monomer (%) | None | 0.1 or less | 0.1 or less | 0.1 or less |

Liquid crystal cells for comparative examples were manufactured. The alignment layer material was the polyamic acid having a photoreactive functional group (10-20) in which the compounds (10-12) and (10-13) constituted 0, 5, 10, or 15 mol %. The polymer layer raw material was a monomer not having a structure containing at least three condensed benzene rings, more specifically, a bifunctional monomer (20) having the following chemical formula, instead of the bifunctional monomer (19). The polymer layer raw material constituted 0.3% by weight of the liquid crystal cells.

[Chem. 26]

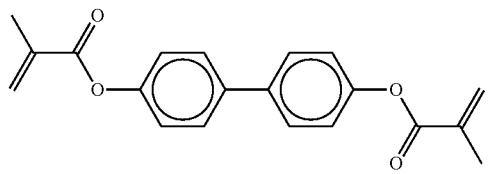

(20)

Table 3 shows the measurement results of the voltage holding ratio, the change in tilt angle, the residual DC voltage, and the residual monomer content of the liquid crystal cells.

TABLE 3

| | Initiator introduced (mol %) | | | |
|---|---|---|---|---|
| | m = 0 | m = 5 | m = 10 | m = 15 |
| VHR (%) | 93.5 | 99.0 | 99.0 | 99.1 |
| rDC (mV) | 450 | 100 | 90 | 90 |
| Δtilt (degrees) | 0.18 | 0.15 | 0.12 | 0.10 |
| Residual monomer (%) | 55 | 2 | 1 | 0.1 or less |

Figure 3:
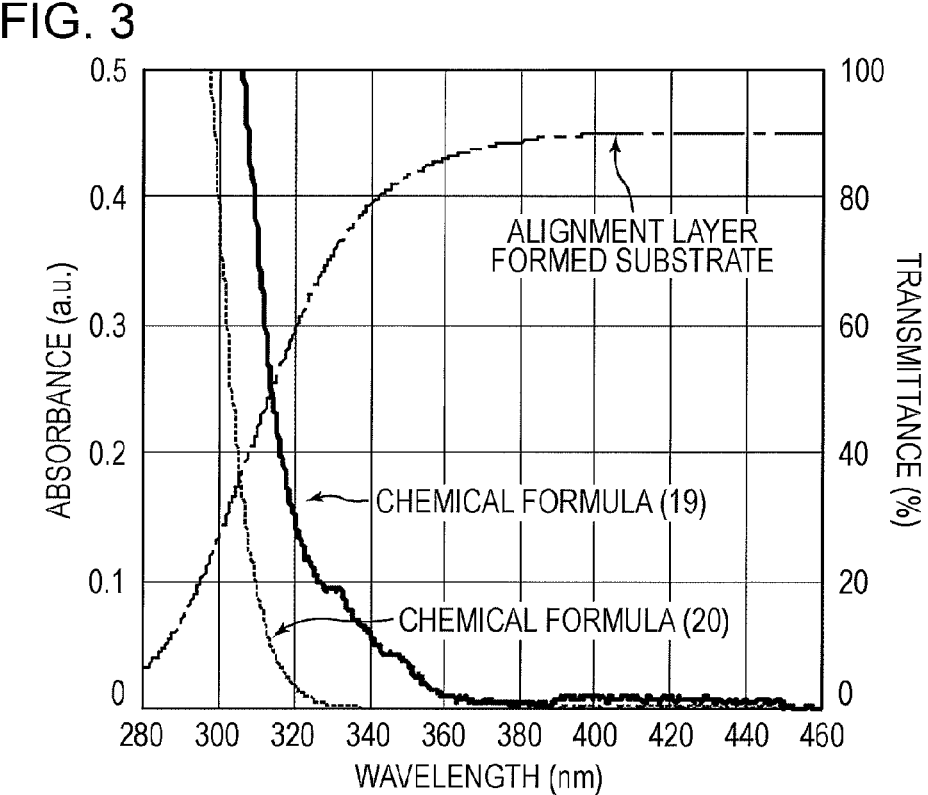
FIG. 3 is a graph of absorption spectra of compounds having the chemical formulae (19) and (20) and a transmission spectrum of a common alignment layer formed substrate.

FIG. 3 is a graph of absorption spectra of the compounds having the chemical formulae (19) and (20) and a transmission spectrum of a common alignment layer formed substrate. The compound having the chemical formula (20) can absorb light having a wavelength of 320 nm or less. The compound having the chemical formula (19) can absorb light having a wavelength of substantially 360 nm or less. Thus, the compound having the chemical formula (19) can absorb light having a wavelength in the range of 330 to 360 nm, which is not absorbed by the compound having the chemical formula (20), and has a wider absorption wavelength range than the compound having the chemical formula (20).

Liquid crystal cells were manufactured such that the bifunctional monomer (20) constituted 0%, 0.15%, 0.3%, or 0.6% by weight while the contents of the compound (10-12) and the compound (10-13) in the alignment layer material were fixed at 10 mol %. Table 4 shows the measurement results of the voltage holding ratio, the change in tilt angle, the residual DC voltage, and the residual monomer content of the liquid crystal cells.

TABLE 4

| | Monomer concentration (% by weight) | | | |
|---|---|---|---|---|
| | 0 | 0.15 | 0.3 | 0.6 |
| VHR (%) | 94.5 | 98.5 | 99.0 | 99.2 |
| rDC (mV) | 500 | 120 | 90 | 90 |
| Δtilt (degrees) | 0.15 | 0.14 | 0.12 | 0.12 |
| Residual monomer (%) | None | 1 | 1 | 1 |

Table 1 shows that the introduction of the compound (10-12) and the compound (10-13) into the alignment layer material, that is, the introduction of a polymerization initiator into a side chain of the alignment layer resulted in satisfactory voltage holding ratios, changes in tilt angle, residual DC voltages, and residual monomer contents. In the absence of a polymerization initiator in a side chain of the alignment layer, although the residual monomer was not detected in the case of ultraviolet irradiation for one hour, the voltage holding ratio, the change in tilt angle, and the residual DC voltage were slightly inferior to those manufactured using a polymerization initiator.

Table 2 shows that use of a photo-alignment layer containing a polymerization initiator in a side chain of the alignment layer resulted in improvements in the voltage holding ratio, the change in tilt angle, and the residual DC voltage as the bifunctional monomer (19) concentration increased. This is probably because unstable effects of the underlying photo-alignment layer on burn-in characteristics decreased with an increase in bifunctional monomer (19) concentration.

Table 3 shows that use of the bifunctional monomer (20) not having a structure containing at least three condensed benzene rings as a polymer layer raw material and the absence of a polymerization initiator in a side chain of the alignment layer resulted in a residual monomer content of more than 50%, a low voltage holding ratio, a large change in tilt angle, and a high residual DC voltage. Although the introduction of a polymerization initiator in a side chain of the alignment layer improved the voltage holding ratio, the change in tilt angle, the residual DC voltage, and the residual monomer content, even the introduction of the polymerization initiator of 15 mol % produced results inferior to the results of the examples.

Table 4 shows that a change in the bifunctional monomer (20) content of even 0.6% by weight, which is close to saturation solubility in liquid crystals, produced results inferior to the results of the examples. These results show that the formation of the polymer layer using a monomer having high absorption efficiency for ultraviolet light having a relatively long wavelength is effective in preventing burn-in.

In the comparative examples, even the production of a radical in a side chain of the alignment layer through ultraviolet light irradiation had a small effect of reducing the polymerization time in the formation of the polymer layer. This is probably because a radical produced on a surface of the alignment layer could not move and was less likely to encounter with a monomer in the liquid crystal layer.

With respect to a monomer to be added to the liquid crystal layer, use of a monomer that can easily absorb ultraviolet light and produce a radical as in the case of the bifunctional monomer (19) can reduce the polymerization time. Use of a single bifunctional monomer as a polymer layer raw material can reduce the number of processes of mixing with liquid crystals as compared with use of a plurality of bifunctional monomers.

EXAMPLE 2

The polyamic acid alignment layer material having photo-alignment ability was used in Example 1. In Example 2, a polyamic acid alignment layer material having vertical alignment ability was used to manufacture a liquid crystal cell relating to a VA technology. The points in common with Example 1 will not be described.

(1) Production of Alignment Layer Material 0.09 mol of a diamine compound having a vertical alignment group (10-18) in the following reaction formula and 0.005 mol of each of the diamine compounds having an initiator function (10-12) and (10-13) (the same as the monomer raw materials (A) and (B) in Example 1) were dissolved in γ-butyrolactone to prepare a monomer solution for an alignment layer material. 0.10 mol of an acid anhydride (10-15) in the following reaction formula was added to the monomer solution and was allowed to react at 60° C. for 12 hours, yielding a polyamic acid (10-21) having a random structure represented by the following chemical formula.

[Chem. 27]

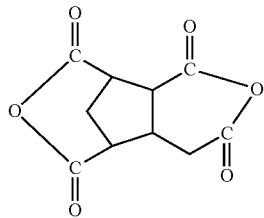
(10-15)

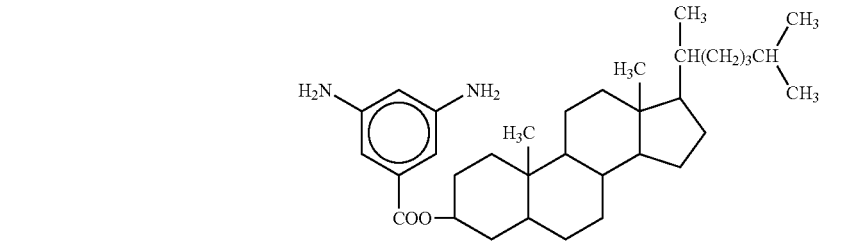
(10-18)

(10-12)

(10-13)

[Chem. 28]

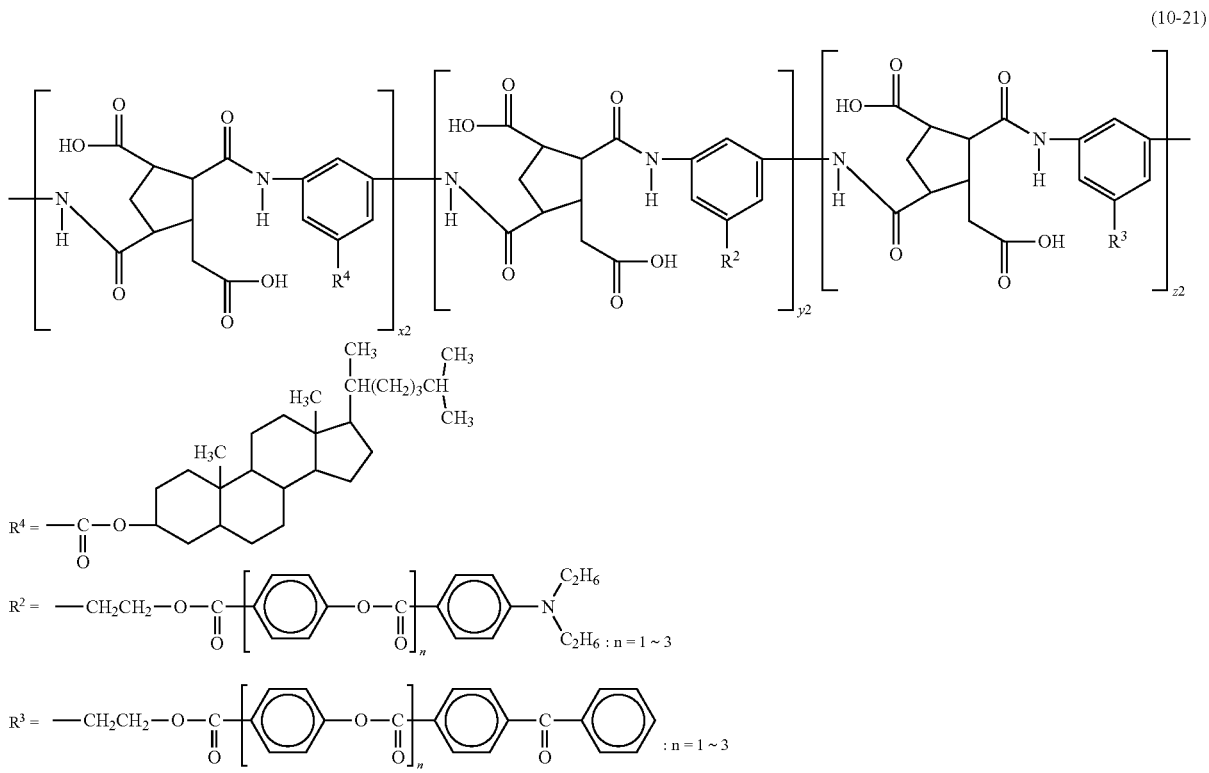
(10-21)

The contents of diamine compounds having an initiator function (10-12) and (10-13) are 10 mol % of the polyamic acid having a vertical alignment group (10-21).

(2) Manufacturing Example of Liquid Crystal Cell

A counter electrode was formed on a principal surface of one of a pair of glass substrates. A vertical alignment layer composed of the polyamic acid having a vertical alignment group (10-21) was formed on the counter electrode. A pixel electrode was formed on the other glass substrate. A vertical alignment layer composed of the polyamic acid having a vertical alignment group (10-21) was formed on the pixel electrode.

A seal was then applied to the periphery of one of the glass substrates, and beads were spread over the surface of the other glass substrate on which the alignment layer had been formed. The glass substrates were bonded together. Liquid crystals having negative dielectric anisotropy were injected between the glass substrates. In addition to liquid crystal molecules, the bifunctional monomer (19), which served as a polymer layer raw material, was mixed with and dissolved in the liquid crystals. After the injection of the liquid crystals, heating at 130° C. and quenching were performed. While a voltage of 5 V was applied to the liquid crystal cell, the liquid crystal cell was then irradiated with ultraviolet light having a wavelength of 365 nm (FHF-32BLB manufactured by Toshiba Lighting & Technology Corp.) for one hour, thereby polymerizing the bifunctional monomer (19).

The polyamic acid having a vertical alignment group (10-21) described above was the compound (10-21) in which the compounds (10-12) and (10-13) constituted 0, 5, 10, or 15 mol %. Liquid crystal cells manufactured using the polyamic acid having a vertical alignment group (10-21) in which the compounds (10-12) and (10-13) constituted 0 mol % serve as comparative examples of the present invention. The bifunctional monomer (19) content was fixed at 0.6% by weight.

(3) Measurements of Characteristics of Liquid Crystal Cells

In the same manner as in Example 1, a liquid crystal cell thus manufactured was placed on a backlight and was energized at 10 V at 30 Hz for 100 hours. After energization on the backlight, the voltage holding ratio, the residual DC voltage, the change in tilt angle, and the residual monomer content were measured. Table 5 shows the results.

TABLE 5

| | Initiator introduced (mol %) | | | |
| --- | --- | --- | --- | --- |
| | m = 0 | m = 5 | m = 10 | m = 15 |
| VHR (%) | 98.4 | 99.2 | 99.2 | 99.2 |
| rDC (mV) | 30 | 0 | 0 | 0 |
| Δtilt (degrees) | 0.08 | 0.02 | 0.02 | 0.02 |
| Residual monomer (%) | 0.1 or less | 0.1 or less | 0.1 or less | 0.1 or less |

Liquid crystal cells were manufactured such that the bifunctional monomer (19) constituted 0%, 0.3%, 0.6%, or 1.0% by weight while the contents of the compound (10-12) and the compound (10-13) in the alignment layer material were fixed at 10 mol %. A liquid crystal cell in which the bifunctional monomer (19) constituted 0% by weight, that is, a liquid crystal cell manufactured without using the bifunctional monomer (19) serves as a comparative example of the present invention. Table 6 shows the measurement results of the voltage holding ratio, the change in tilt angle, the residual DC voltage, and the residual monomer content of the liquid crystal cells.

TABLE 6

| | Monomer concentration (% by weight) | | | |
| --- | --- | --- | --- | --- |
| | 0 | 0.3 | 0.6 | 1.0 |
| VHR (%) | 97.5 | 99.5 | 99.5 | 99.5 |
| rDC (mV) | 120 | 0 | 0 | 0 |
| Δtilt (degrees) | 0.16 | 0.03 | 0.02 | 0.02 |
| Residual monomer (%) | None | 0.1 or less | 0.1 or less | 0.1 or less |

Liquid crystal cells for comparative examples were manufactured. The alignment layer material was the polyamic acid having a vertical alignment group (10-21) in which the compounds (10-12) and (10-13) constituted 0, 5, 10, or 15 mol %. The polymer layer raw material was a monomer not having a structure containing at least three condensed benzene rings, more specifically, a bifunctional monomer (20) having the chemical formula described above, instead of the bifunctional monomer (19). The polymer layer raw material constituted 0.3% by weight of the liquid crystal cells. Table 7 shows the measurement results of the voltage holding ratio, the change in tilt angle, the residual DC voltage, and the residual monomer content of the liquid crystal cells.

TABLE 7

| | Initiator introduced mol %) | | | |
| --- | --- | --- | --- | --- |
| | m = 0 | m = 5 | m = 10 | m = 15 |
| VHR (%) | 92.2 | 98.5 | 99.0 | 99.0 |
| rDC (mV) | 500 | 120 | 110 | 100 |
| Δtilt (degrees) | 0.17 | 0.15 | 0.12 | 0.11 |
| Residual monomer (%) | 65 | 10 | 7 | 3 |

Liquid crystal cells were manufactured such that the bifunctional monomer (20) constituted 0%, 0.15%, 0.3%, or 0.6% by weight while the contents of the compound (10-12) and the compound (10-13) in the alignment layer material were fixed at 10 mol %. Table 8 shows the measurement results of the voltage holding ratio, the change in tilt angle, the residual DC voltage, and the residual monomer content of the liquid crystal cells.

TABLE 8

| | Monomer concentration (% by weight) | | | |
| --- | --- | --- | --- | --- |
| | 0 | 0.15 | 0.3 | 0.6 |
| VHR (%) | 93.5 | 98.5 | 99.0 | 99.2 |
| rDC (mV) | 520 | 120 | 110 | 90 |
| Δtilt (degrees) | 0.15 | 0.13 | 0.12 | 0.12 |
| Residual monomer (%) | None | 7 | 7 | 8 |

Table 5 shows that the introduction of the compound (10-12) and the compound (10-13) into the vertical alignment layer material, that is, the introduction of a polymerization initiator into a side chain of the alignment layer resulted in satisfactory voltage holding ratios, changes in tilt angle, residual DC voltages, and residual monomer contents, as in the photo-alignment layer described in Example 1. In the absence of a polymerization initiator in a side chain of the alignment layer, although the residual monomer was not detected in the case of ultraviolet irradiation for one hour, the voltage holding ratio, the change in tilt angle, and the residual DC voltage were slightly inferior to those manufactured using a polymerization initiator.

Table 6 shows that use of a vertical alignment layer containing a polymerization initiator in a side chain of the alignment layer resulted in improvements in the voltage holding ratio, the change in tilt angle, and the residual DC voltage as the bifunctional monomer (19) concentration increased. This is probably because unstable effects of the underlying vertical-alignment layer on burn-in characteristics decreased with an increase in bifunctional monomer (19) concentration.

Table 7 shows that use of the bifunctional monomer (20) not having a structure containing at least three condensed benzene rings as a polymer layer raw material and the absence of a polymerization initiator in a side chain of the alignment layer resulted in a residual monomer content of more than 50%, a low voltage holding ratio, a large change in tilt angle, and a high residual DC voltage. Although the introduction of a polymerization initiator in a side chain of the alignment layer improved the voltage holding ratio, the change in tilt angle, the residual DC voltage, and the residual monomer content, even the introduction of the polymerization initiator of 15 mol % produced results inferior to the results of the examples.

Table 8 shows that a change in the bifunctional monomer (20) content of even 0.6% by weight, which is close to saturation solubility in liquid crystals, produced results inferior to the results of the examples. These results show that in the vertical alignment layer the formation of the polymer layer using a monomer having high absorption efficiency for ultraviolet light having a relatively long wavelength is effective in preventing burn-in, as in the vertical-alignment layer.

In the comparative examples, even the production of a radical in a side chain of the alignment layer through ultraviolet light irradiation had a small effect of reducing the polymerization time in the formation of the polymer layer. This is probably because a radical produced on a surface of the alignment layer could not move and was less likely to encounter with a monomer in the liquid crystal layer.

With respect to a monomer to be added to the liquid crystal layer, use of a monomer that can easily absorb ultraviolet light and produce a radical as in the case of the bifunctional monomer (19) can reduce the polymerization time. Use of a single bifunctional monomer as a polymer layer raw material can reduce the number of processes of mixing with liquid crystals as compared with use of a plurality of bifunctional monomers.

EXAMPLE 3

In Example 1, the polyamic acid alignment layer material having photo-alignment ability was used as an alignment layer material, and a phenanthrene bifunctional monomer was used as a polymerization monomer for forming a polymer layer. In Example 3, a liquid crystal cell was manufactured using a polyamic acid alignment layer material having photo-alignment ability as an alignment layer material and an anthracene bifunctional monomer and another bifunctional monomer as polymerization monomers for forming a polymer layer. The points in common with Example 1 or 2 will not be described.

(1) Manufacturing Example of Liquid Crystal Cell

A counter electrode was formed on a principal surface of one of a pair of glass substrates. A vertical alignment layer composed of the polyamic acid having a photoreactive functional group (10-20) was formed on the counter electrode. A pixel electrode was formed on the other glass substrate. A vertical alignment layer composed of the polyamic acid having a photoreactive functional group (10-20) was formed on the pixel electrode. Each of the glass substrates was irradiated with linearly polarized light in an oblique direction to perform photo-alignment treatment.

A seal was applied to the periphery of one of the glass substrates, and beads were spread over the surface of the other glass substrate on which the alignment layer had been formed. The glass substrates were bonded together. Liquid crystals having negative dielectric anisotropy were injected between the glass substrates. In addition to liquid crystal molecules, a bifunctional monomer (23) having the following chemical formula and the bifunctional monomer (20) not having a structure containing at least three condensed benzene rings represented by the chemical formula described above, which served as polymer layer raw materials, were mixed with and dissolved in the liquid crystals. After the injection of the liquid crystals, heating at 130° C. and quenching were performed. The liquid crystal cell was then irradiated with ultraviolet light having a wavelength of 365 nm (FHF-32BLB manufactured by Toshiba Lighting & Technology Corp.) for one hour, thereby polymerizing the bifunctional monomers (23) and (20). During the polymerization reaction, no voltage was applied to the liquid crystal cell.

[Chem. 29]

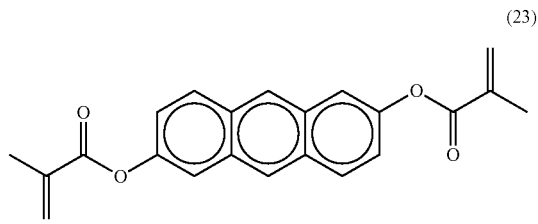

(23)

Figure 4:
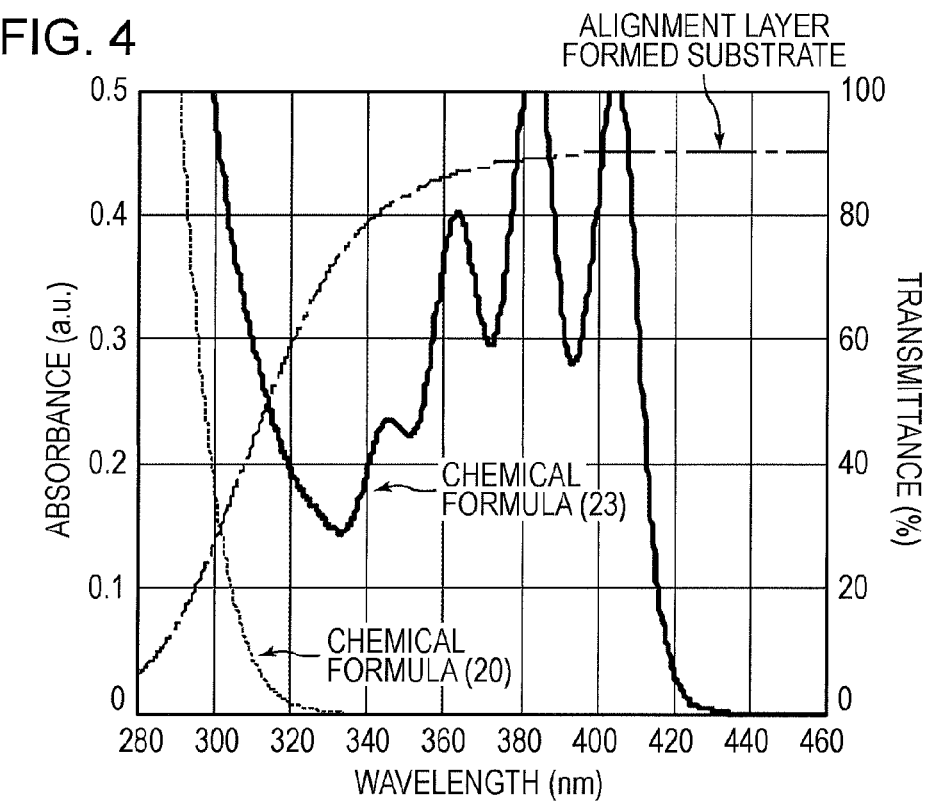
FIG. 4 is a graph of absorption spectra of compounds having the chemical formulae (20) and (23) and a transmission spectrum of a common alignment layer formed substrate.
Figure 5:
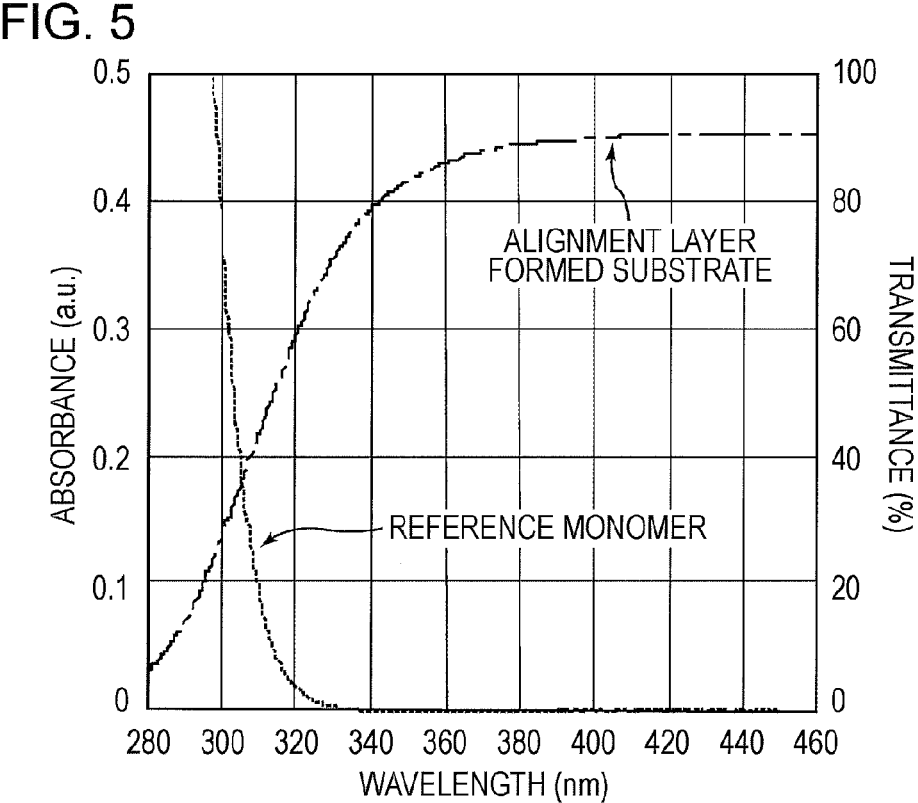
FIG. 5 is a graph showing the relationship between the absorbance (a.u.) of a reference monomer and transmittance (%) through an alignment layer formed substrate.
Figure 6:
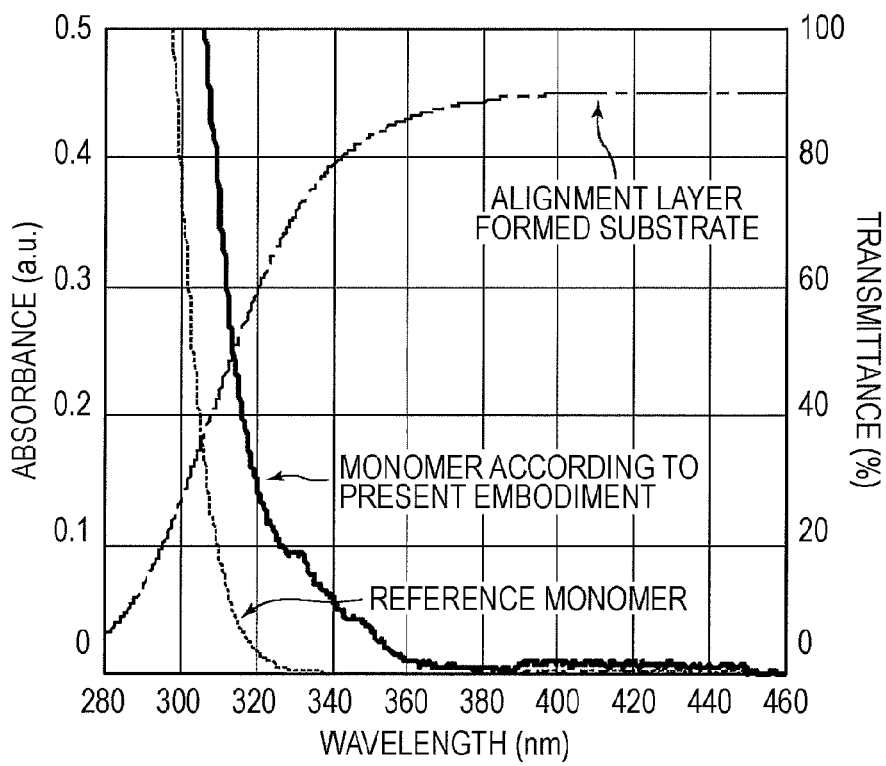
FIG. 6 is a graph showing the relationship between the absorbance (a.u.) of a monomer according to an embodiment of the present invention and transmittance (%) through an alignment layer formed substrate.

FIG. 4 is a graph of absorption spectra of compounds having the chemical formulae (20) and (23) and a transmission spectrum of a common alignment layer formed substrate. The compound having the chemical formula (20) can absorb light having a wavelength of 320 nm or less. The compound having the chemical formula (23) can absorb light having a wavelength of 430 nm or less. Thus, the compound having the chemical formula (23) can absorb light having a wavelength in the range of 330 to 430 nm, which is not absorbed by the compound having the chemical formula (20), and has a wider absorption wavelength range than the compound having the chemical formula (20).

The polyamic acid having a photoreactive functional group (10-20) described above was the compound (10-20) in which the compounds (10-12) and (10-13) constituted 0, 5, 10, or 15 mol %. Liquid crystal cells manufactured using the polyamic acid having a photoreactive functional group (10-20) in which the compounds (10-12) and (10-13) constituted 0 mol % serve as comparative examples of the present invention. The bifunctional monomer (23) content was fixed at 0.1% by weight, and the bifunctional monomer (20) content was fixed at 0.2% by weight.

(2) Measurements of Characteristics of Liquid Crystal Cells

In the same manner as in Example 1, a liquid crystal cell thus manufactured was placed on a backlight and was energized at 10 V at 30 Hz for 100 hours. After energization on the backlight, the voltage holding ratio, the residual DC voltage, the change in tilt angle, and the residual monomer content were measured. Table 9 shows the results.

TABLE 9

|  | Initiator introduced mol % | | | |
| --- | --- | --- | --- | --- |
|  | m = 0 | m = 5 | m = 10 | m = 15 |
| VHR (%) | 95.4 | 99.2 | 99.5 | 99.5 |
| rDC (mV) | 0 | 0 | 0 | 0 |
| Δtilt (degrees) | 0.25 | 0.17 | 0.15 | 0.11 |
| Residual monomer (%) | 0.1 or less | 0.1 or less | 0.1 or less | 0.1 or less |

Liquid crystal cells were manufactured such that the bifunctional monomer (20) constituted 0%, 0.2%, 0.4%, and 0.6% by weight while the contents of the compound (10-12)

and the compound (10-13) in the alignment layer material were fixed at 10 mol % and the amount of the bifunctional monomer (23) was fixed at 0.1% by weight. Table 10 shows the measurement results of the voltage holding ratio, the change in tilt angle, the residual DC voltage, and the residual monomer content of the liquid crystal cells.

TABLE 10

|  | Bifunctional monomer (20) (% by weight) | | | |
| --- | --- | --- | --- | --- |
|  | 0 | 0.2 | 0.4 | 0.6 |
| VHR (%) | 93.5 | 99.5 | 99.5 | 99.5 |
| rDC (mV) | 10 | 0 | 0 | 10 |
| Δtilt (degrees) | 0.15 | 0.15 | 0.11 | 0.05 |
| Residual monomer (%) | 0.1 or less | 0.1 or less | 0.1 or less | 0.1 or less |

Table 3 shows that even when a polymerization initiator was introduced into a side chain of the alignment layer use of the bifunctional monomer (20) alone, which did not have a structure containing at least three condensed benzene rings, as a polymer layer raw material produced poor results with respect to the voltage holding ratio, the change in tilt angle, and the residual DC voltage. In contrast, as shown in Table 9, the introduction of a polymerization initiator in a side chain of the alignment layer and the introduction of the bifunctional monomer (20) and the anthracene bifunctional monomer (23) as polymer layer raw materials resulted in satisfactory voltage holding ratios, changes in tilt angle, residual DC voltages, and residual monomer contents. This is probably because a radical derived from the anthracene bifunctional monomer (23), which can absorb light having a wavelength in the range of approximately 330 to 430 nm, also promoted the polymerization of the bifunctional monomer (20).

Table 10 shows that use of a photo-alignment layer containing a polymerization initiator in a side chain of the alignment layer and use of the bifunctional monomers (20) and (23) as polymer layer raw materials resulted in improvements in the voltage holding ratio, the change in tilt angle, and the residual DC voltage as the bifunctional monomer (20) concentration increased. This is probably because unstable effects of the underlying photo-alignment layer on burn-in characteristics decreased with an increase in bifunctional monomer (20) concentration.

Thus, when two types of bifunctional monomers are used in combination, the mixing ratio can be appropriately controlled so as to reduce the polymerization time and improve burn-in characteristics. Regarding the reduction in polymerization time, even when a bifunctional monomer that does not substantially absorb long-wavelength light (light having a wavelength of 330 nm or more) (for example, the bifunctional monomer (20)) is used, simultaneous use of an anthracene bifunctional monomer that can greatly absorb long-wavelength light (for example, the bifunctional monomer (23)) can increase the polymerization reaction rate. Use of the anthracene bifunctional monomer can also reduce residual DC voltage. Use of a bifunctional monomer having a biphenyl skeleton (for example, the bifunctional monomer (20)) can reduce the change in tilt angle. When the two types of bifunctional monomers are an anthracene bifunctional monomer and a bifunctional monomer having a biphenyl skeleton, the ratio of the anthracene bifunctional monomer to the total of the two types of bifunctional monomers is preferably 14 mol % or more and 20 mol % or less. When the ratio of the anthracene bifunctional monomer is less than 14 mol %, the residual DC voltage may be slightly increased, and the polymerization time may be insufficiently reduced. When the ratio of the anthracene bifunctional monomer is more than 20 mol %, the change in tilt angle is excessively increased.

EXAMPLE 4

In Example 3, the polyamic acid alignment layer material having photo-alignment ability was used as an alignment layer material, and the anthracene bifunctional monomer and another bifunctional monomer were used as polymerization monomers for forming a polymer layer. In Example 4, a liquid crystal cell was manufactured using a polyamic acid alignment layer material having vertical alignment ability as an alignment layer material. The points in common with any one of Examples 1 to 3 will not be described.

(1) Manufacturing Example of Liquid Crystal Cell

A counter electrode was formed on a principal surface of one of a pair of glass substrates. A vertical alignment layer composed of the polyamic acid having a vertical alignment group (10-21) was formed on the counter electrode. A pixel electrode was formed on the other glass substrate. A vertical alignment layer composed of the polyamic acid having a vertical alignment group (10-21) was formed on the pixel electrode.

A seal was applied to the periphery of one of the glass substrates, and beads were spread over the surface of the other glass substrate on which the alignment layer had been formed. The glass substrates were bonded together. Liquid crystals having negative dielectric anisotropy were injected between the glass substrates. In addition to liquid crystal molecules, the bifunctional monomer (23) having the chemical formula described above and the bifunctional monomer (20) not having a structure containing at least three condensed benzene rings represented by the chemical formula described above, which served as polymer layer raw materials, were mixed with and dissolved in the liquid crystals. After the injection of the liquid crystals, heating at 130° C. and quenching were performed. While a voltage of 5 V was applied to the liquid crystal cell, the liquid crystal cell was then irradiated with ultraviolet light having a wavelength of 365 nm (FHF-32BLB manufactured by Toshiba Lighting & Technology Corp.) for one hour, thereby polymerizing the bifunctional monomers (23) and (20).

The polyamic acid having a vertical alignment group (10-21) described above was the compound (10-21) in which the compounds (10-12) and (10-13) constituted 0, 5, 10, or 15 mol %. Liquid crystal cells manufactured using the polyamic acid having a vertical alignment group (10-21) in which the compounds (10-12) and (10-13) constituted 0 mol % serve as comparative examples of the present invention. The bifunctional monomer (23) content was fixed at 0.1% by weight, and the bifunctional monomer (20) content was fixed at 0.2% by weight.

(2) Measurements of Characteristics of Liquid Crystal Cells

In the same manner as in Example 1, a liquid crystal cell thus manufactured was placed on a backlight and was energized at 10 V at 30 Hz for 100 hours. After energization on the backlight, the voltage holding ratio, the residual DC voltage, the change in tilt angle, and the residual monomer content were measured. Table 11 shows the results.

TABLE 11

|  | Initiator introduced mol % | | | |
|---|---|---|---|---|
|  | m = 0 | m = 5 | m = 10 | m = 15 |
| VHR (%) | 96.5 | 99.5 | 99.5 | 99.5 |
| rDC (mV) | 0 | 0 | 0 | 0 |
| Δtilt (degrees) | 0.28 | 0.15 | 0.14 | 0.12 |
| Residual monomer (%) | 0.1 or less | 0.1 or less | 0.1 or less | 0.1 or less |

Liquid crystal cells were manufactured such that the bifunctional monomer (20) constituted 0%, 0.2%, 0.4%, and 0.6% by weight while the contents of the compound (10-12) and the compound (10-13) in the alignment layer material were fixed at 10 mol % and the amount of the bifunctional monomer (23) was fixed at 0.1% by weight. Table 12 shows the measurement results of the voltage holding ratio, the change in tilt angle, the residual DC voltage, and the residual monomer content of the liquid crystal cells.

TABLE 12

|  | Bifunctional monomer (20) (% by weight) | | | |
|---|---|---|---|---|
|  | 0 | 0.2 | 0.4 | 0.6 |
| VHR (%) | 93.5 | 99.5 | 99.5 | 99.5 |
| rDC (mV) | 0 | 0 | 0 | 0 |
| Δtilt (degrees) | 0.27 | 0.14 | 0.11 | 0.04 |
| Residual monomer (%) | 0.1 or less | 0.1 or less | 0.1 or less | 0.1 or less |

Table 7 shows that even when a polymerization initiator was introduced into a side chain of the vertical alignment layer use of the bifunctional monomer (20) alone, which did not have a structure containing at least three condensed benzene rings, as a polymer layer raw material produced poor results with respect to the voltage holding ratio, the change in tilt angle, and the residual DC voltage. In contrast, as shown in Table 11, the introduction of a polymerization initiator in a side chain of the vertical alignment layer and the introduction of the bifunctional monomer (20) and the anthracene bifunctional monomer (23) as polymer layer raw materials resulted in satisfactory voltage holding ratios, changes in tilt angle, residual DC voltages, and residual monomer contents, as in the photo-alignment layer in Example 3. This is probably because a radical derived from the anthracene bifunctional monomer (23), which can absorb light having a wavelength in the range of approximately 330 to 430 nm, also promoted the polymerization of the bifunctional monomer (20).

Table 12 shows that use of a vertical alignment layer containing a polymerization initiator in a side chain of the alignment layer and use of the bifunctional monomers (20) and (23) as polymer layer raw materials resulted in improvements in the voltage holding ratio, the change in tilt angle, and the residual DC voltage as the bifunctional monomer (20) concentration increased. This is probably because unstable effects of the underlying vertical-alignment layer on burn-in characteristics decreased with an increase in bifunctional monomer (20) concentration.

Thus, when two types of bifunctional monomers are used in combination, the mixing ratio can be appropriately controlled so as to reduce the polymerization time and improve burn-in characteristics. Regarding the reduction in polymerization time, even when a bifunctional monomer that does not substantially absorb long-wavelength light (light having a wavelength of 330 nm or more) (for example, the bifunctional monomer (20)) is used, simultaneous use of an anthracene bifunctional monomer that can greatly absorb long-wavelength light (for example, the bifunctional monomer (23)) can increase the polymerization reaction rate. Use of the anthracene bifunctional monomer can also reduce residual DC voltage. Use of a bifunctional monomer having a biphenyl skeleton (for example, the bifunctional monomer (20)) can reduce the change in tilt angle. When the two types of bifunctional monomers are an anthracene bifunctional monomer and a bifunctional monomer having a biphenyl skeleton, the ratio of the anthracene bifunctional monomer to the total of the two types of bifunctional monomers is preferably 14 mol % or more and 20 mol % or less. When the ratio of the anthracene bifunctional monomer is less than 14 mol %, the residual DC voltage may be slightly increased, and the polymerization time may be insufficiently reduced. When the ratio of the anthracene bifunctional monomer is more than 20 mol %, the change in tilt angle is excessively increased.

The present application claims priority under the Paris Convention and the domestic law in the country to be entered into national phase on Japanese Patent Application No. 2010-271627, filed on Dec. 6, 2010. The contents of this application are incorporated herein by reference in its entirety.

REFERENCE SIGNS LIST

1 array substrate

2 color filter substrate

3 liquid crystal layer

11, 21 supporting substrate

12, 22 alignment layer

13, 23 polymer layer

14 monomer

15 radical

16 covalent bonding portion

The invention claimed is:

1. A liquid crystal display device, comprising: a pair of substrates and a liquid crystal layer between the pair of substrates, wherein at least one of the pair of substrates includes an alignment layer and a polymer layer for controlling the alignment of adjacent liquid crystal molecules, the polymer layer being disposed on the alignment layer, the polymer layer having a structure containing at least three condensed benzene rings, the alignment layer being covalently bonded to the polymer layer, the polymer layer being formed by the polymerization of at least one monomer, the liquid crystal layer being a liquid crystal layer of a vertical alignment type, the alignment layer being formed of a polyimide or a polyamic acid, and the polyimide and the polyamic acid have polymerization-initiating functional groups of at least two types and a structure having the following general formula (3) or (4):

[Chem. 3]

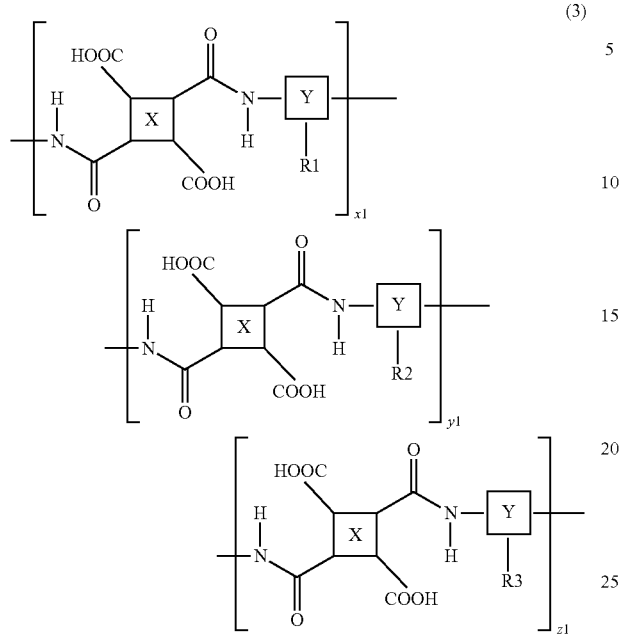

(3)

[Chem. 4]

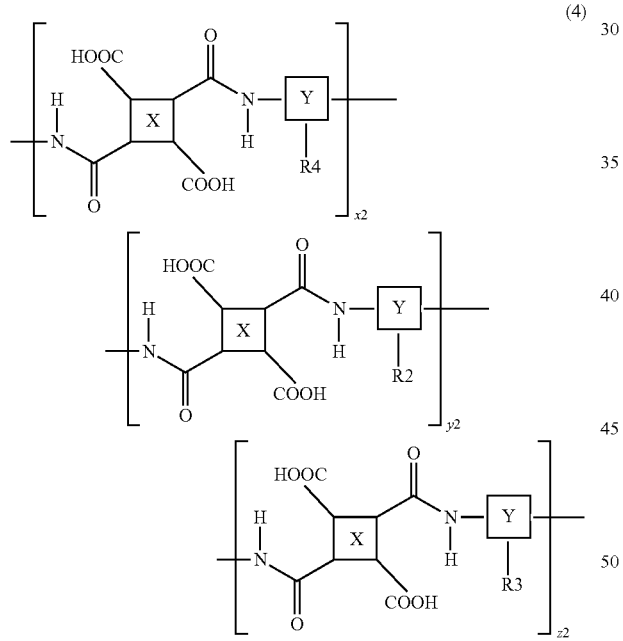

(4)

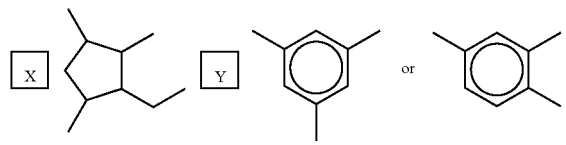

(wherein R1 denotes a photoreactive functional group for aligning liquid crystal molecules of the liquid crystal layer in a predetermined direction through light irradiation, R4 denotes a vertical alignment functional group for vertically aligning liquid crystal molecules, R2 and R3 denote different polymerization-initiating functional groups, x1, x2, y1, y2, z1, and z2 denote the number of repeating units and are at least 1, a predetermined proportion of carboxy groups of each of the repeating units may be imidized, and the repeating units may be randomly arranged).

2. The liquid crystal display device according to claim 1, wherein the at least one monomer is a compound having the following general formula (1):

$$P^1\text{-}A^1\text{-}(Z^1\text{-}A^2)n\text{-}P^2 \tag{1}$$

(wherein $P^1$ and $P^2$ denote the same or different acrylate groups or methacrylate groups, $A^1$ and $A^2$ denote at least one condensed aromatic compound selected from the group consisting of the following chemical formulae (1-1) to (1-15), a hydrogen atom of $A^1$ and $A^2$ may be substituted by a halogen group, a methyl group, an ethyl group, or a propyl group, $Z^1$ denotes COO, OCO, O, CO, NHCO, CONH, or S, or represents direct bonding between $A^1$ and $A^2$ or between $A^2$ and $A^2$, and n denotes 0, 1, or 2)

[Chem. 1]

[Chem. 1]

(1-1)

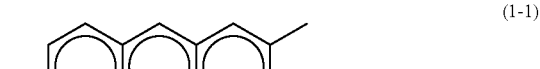
(1-2)

(1-3)

(1-4)

(1-5)

(1-6)

(1-7)

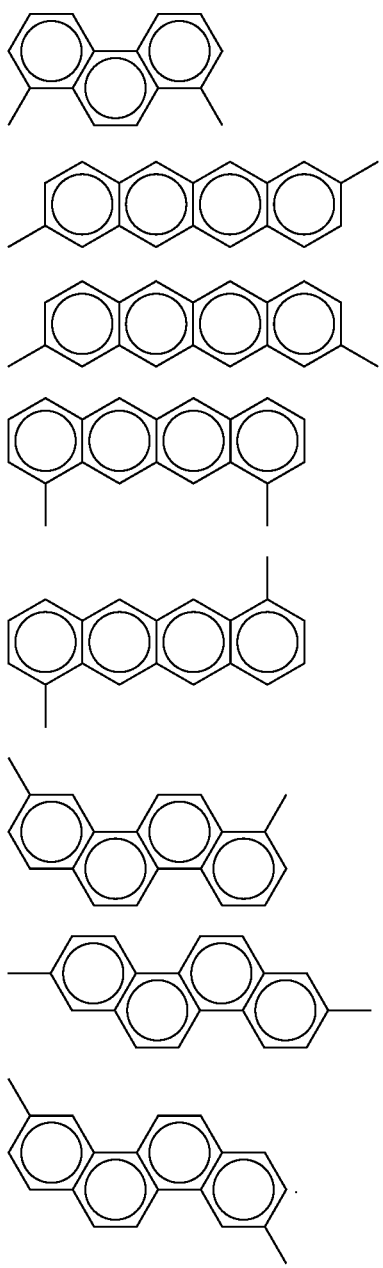

(1-8)
(1-9)
(1-10)
(1-11)
(1-12)
(1-13)
(1-14)
(1-15)

3. The liquid crystal display device according to claim 1, wherein the at least one monomer is a compound having the following general formula (2):

$$P^1\text{-}A^1\text{-}P^1 \quad (2)$$

(wherein $P^1$ denotes an acrylate group or a methacrylate group, $A^1$ denotes a condensed aromatic compound having the following chemical formula (2-1) or (2-2), and a hydrogen atom of $A^1$ may be substituted by a halogen group, a methyl group, an ethyl group, or a propyl group)

[Chem. 2]

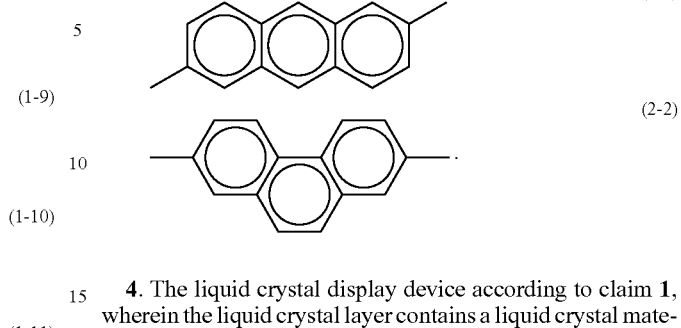

(2-1)

(2-2)

4. The liquid crystal display device according to claim 1, wherein the liquid crystal layer contains a liquid crystal material having negative dielectric anisotropy.

5. The liquid crystal display device according to claim 1, wherein the polyimide or the polyamic acid has at least one polymerization-initiating functional group which has a function of producing a radical through a hydrogen abstraction reaction and initiating a polymerization reaction of the at least one monomer.

6. The liquid crystal display device according to claim 1, wherein x1, y1, and z1 of the general formula (3) satisfy $0<y1/(x1+y1+z1)<0.15$, y1 is substantially equal to z1, x2, y2, and z2 of the general formula (4) satisfy $0<y2/(x2+y2+z2)<0.15$, and y2 is substantially equal to z2.

7. The liquid crystal display device according to claim 1, wherein the different polymerization-initiating functional groups are functional groups derived from an amine and an aromatic ketone.

8. The liquid crystal display device according to claim 1, wherein the alignment layer and the polymer layer align the liquid crystal molecules such that liquid crystal molecules of the liquid crystal layer are inclined with respect to a direction normal to a principal surface of the alignment layer in the absence of an applied voltage.

9. The liquid crystal display device according to claim 1, further comprising a plurality of pixels, each of the plurality of pixels including a plurality of domains in which the alignment direction of liquid crystal molecules of the liquid crystal layer varies from one domain to another in the absence of an applied voltage or in the presence of an applied voltage.

10. The liquid crystal display device according to claim 9, wherein the plurality of domains are four domains.

11. The liquid crystal display device according to claim 1, wherein the at least one monomer includes a first bifunctional monomer having an anthracene skeleton, and the polymer layer is formed by the polymerization of the first bifunctional monomer and a second bifunctional monomer having no anthracene skeleton.

12. The liquid crystal display device according to claim 11, wherein the second bifunctional monomer is a bifunctional monomer having a biphenyl skeleton.

13. The liquid crystal display device according to claim 12, wherein the ratio of the first bifunctional monomer to the total of the first bifunctional monomer and the second bifunctional monomer before the polymerization of the first bifunctional monomer and the second bifunctional monomer is 14 mol % or more and 20 mol % or less.

* * * * *